(12) United States Patent
Miller et al.

(10) Patent No.: US 11,983,678 B1
(45) Date of Patent: May 14, 2024

(54) SYSTEMS AND METHODS FOR RESTROOM CONSUMABLES MONITORING AND MAINTENANCE SCHEDULING

(71) Applicant: American Paper Converting Inc., Woodland, WA (US)

(72) Inventors: Cody Miller, Woodland, WA (US); Eric Work, San Carlos, CA (US)

(73) Assignee: American Paper Converting Inc., Woodland, WA (US)

( * ) Notice: Subject to any disclaimer, the term of this patent is extended or adjusted under 35 U.S.C. 154(b) by 435 days.

(21) Appl. No.: 17/035,475

(22) Filed: Sep. 28, 2020

Related U.S. Application Data

(60) Provisional application No. 62/906,555, filed on Sep. 26, 2019.

(51) Int. Cl.
| | |
|---|---|
| *G06Q 10/20* | (2023.01) |
| *A47K 10/32* | (2006.01) |
| *G06K 7/10* | (2006.01) |
| *G06Q 10/0631* | (2023.01) |
| *G06Q 10/087* | (2023.01) |
| *G08B 21/18* | (2006.01) |

(52) U.S. Cl.
CPC ............. *G06Q 10/20* (2013.01); *A47K 10/32* (2013.01); *G06K 7/10366* (2013.01); *G06Q 10/06312* (2013.01); *G06Q 10/087* (2013.01); *G08B 21/182* (2013.01); *A47K 2010/3226* (2013.01)

(58) Field of Classification Search
CPC ..................................................... G06Q 10/20
See application file for complete search history.

(56) References Cited

U.S. PATENT DOCUMENTS

| | | | |
|---|---|---|---|
| 11,488,077 B1 * | 11/2022 | Lyman | ................. H04L 12/2825 |
| 2012/0095703 A1 | 4/2012 | Zakrzewski et al. | |
| 2013/0173178 A1 | 7/2013 | Poczka et al. | |
| 2014/0278508 A1 * | 9/2014 | Akdogan | ............. B01D 53/261 |
| | | | 705/2 |
| 2016/0176630 A1 | 6/2016 | Shahabdeen | |
| 2016/0178228 A1 | 6/2016 | Shahabdeen | |
| 2016/0179065 A1 | 6/2016 | Shahabdeen | |
| 2018/0306609 A1 * | 10/2018 | Agarwal | .................. H04L 67/12 |
| 2019/0086890 A1 * | 3/2019 | Bradley | .................. E03D 5/105 |
| 2019/0320515 A1 * | 10/2019 | Sadwick | ................ H05B 45/00 |
| 2020/0244297 A1 * | 7/2020 | Zalewski | ............... H04W 76/10 |

FOREIGN PATENT DOCUMENTS

WO  WO/2016/100140  6/2016

OTHER PUBLICATIONS

Cocconcelli et al (Development of a Methodology for Condition-Based Maintenance in a Large-Scale Application Field, Machines 6, No. 2: 17 (Year: 2018).*

* cited by examiner

*Primary Examiner* — Andre D Boyce

(74) *Attorney, Agent, or Firm* — Klarquist Sparkman, LLP

(57) ABSTRACT

A method of managing cleaning services is disclosed herein. The method can include measuring a quantity of a consumable product remaining in a product dispenser, transmitting the quantity of consumable product remaining in the product dispenser to a remote computing platform, generating a schedule for servicing the product dispenser based at least in part on the quantity of the consumable product remaining in the dispenser, storing the schedule in a memory, and transmitting the schedule to maintenance personnel over a network.

19 Claims, 17 Drawing Sheets

SYSTEMS AND METHODS FOR RESTROOM CONSUMABLES MONITORING AND MAINTENANCE SCHEDULING

RELATED APPLICATION

This application claims the benefit of U.S. Provisional Patent Application Ser. No. 62/906,555, entitled "SYSTEMS AND METHODS FOR RESTROOM CONSUMABLES MONITORING AND MAINTENANCE SCHEDULING," filed on Sep. 26, 2019, which is incorporated by reference herein.

FIELD

The present disclosures pertain to systems and methods for monitoring consumables in facilities such as restrooms, and systems and methods for generating maintenance schedules for the restrooms based on data of the consumables.

BACKGROUND

Planning and scheduling maintenance, service, and cleaning of facilities such as restrooms in commercial environments presents significant challenges. Existing methods include planning a route to check every location at a facility at a regular interval whether service is needed or not. This can result in a significant amount of time servicing restrooms where no maintenance is required, and waste of consumables such as toilet paper and paper towels, which may get replaced despite a significant amount of product still remaining on the rolls. Other existing challenges include the difficulty of quantitatively measuring dispensed consumables and real-time detection of tampering activities. Accordingly, there is a need for a better way to manage the maintenance and care of restrooms and washrooms to reduce the number of unneeded trips to service them and reduce waste, to provide accurate analytics for usage of consumables and predictive planning, and to protect the integrity of dispensing devices.

SUMMARY

Figure 1:
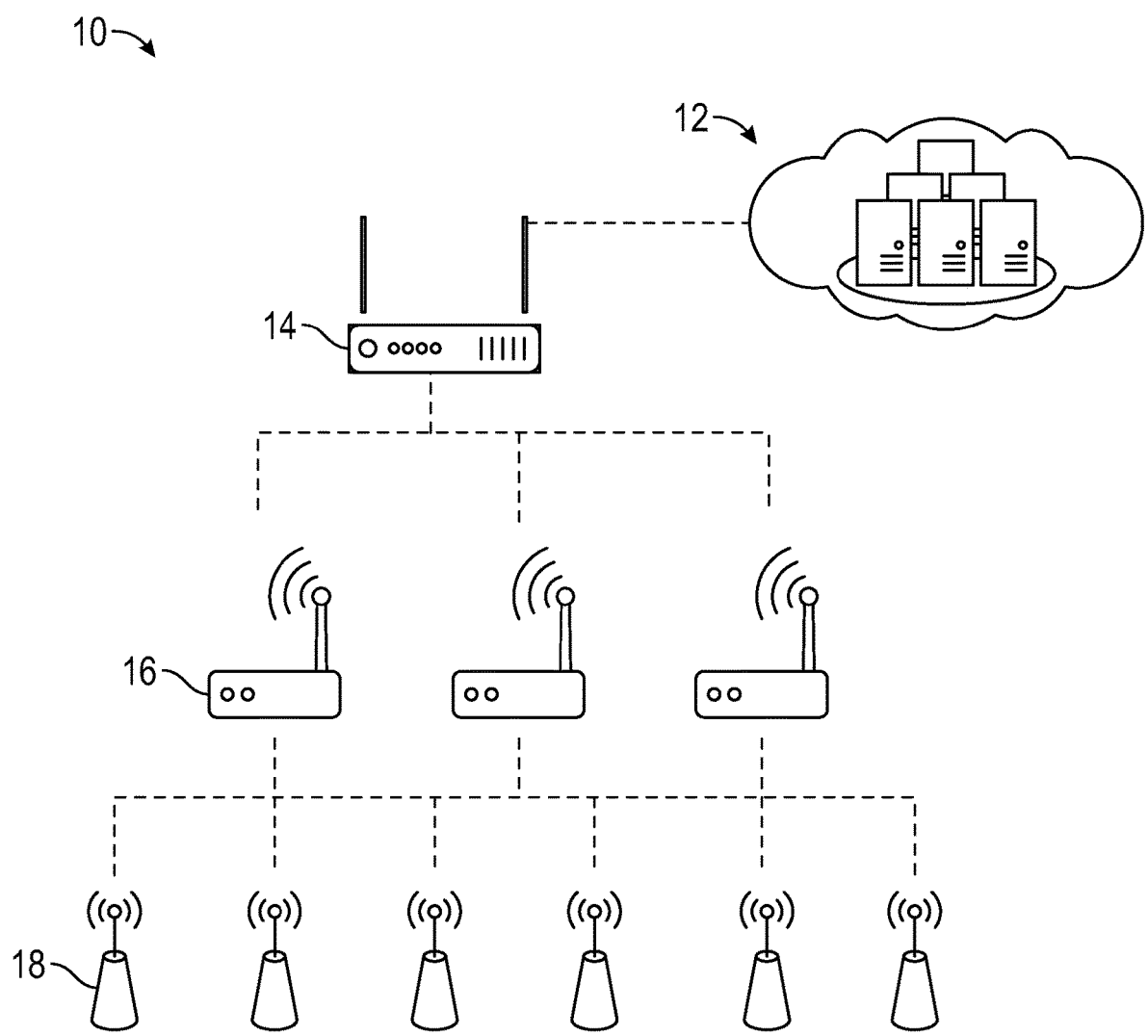
FIG. 1 illustrates a representative embodiment of a multi-level device network.

The technology described herein addresses the challenges noted above by using a smart connected restroom system, as described below.

Certain embodiments of the disclosure concern a method of managing cleaning services. The method can include measuring a quantity of a consumable product remaining in a product dispenser in a restroom, transmitting the quantity of consumable product remaining in the product dispenser to a remote computing platform, generating a schedule for servicing the product dispenser based at least in part on the quantity of the consumable product remaining in the dispenser, storing the schedule in a memory, and transmitting the schedule to maintenance personnel over a network.

In some embodiments, the method can further include detecting an early depletion event where a newly measured quantity of consumable product remaining in the product dispenser is below a predefined threshold such that a currently estimated service time for the product dispenser is earlier than the schedule, updating the schedule based on the currently estimated service time, storing the updated schedule in the memory, and transmitting the updated schedule to maintenance personnel over the network. The currently estimated service time can be calculated based at least in part on the newly measured quantity of consumable product remaining in the product dispenser.

In some embodiments, the product dispenser can be a first product dispenser and the schedule can be a first schedule contained in a master schedule. The master schedule can include at least a second schedule for servicing a second product dispenser, and the method can further include updating the second schedule upon updating the first schedule.

In some embodiments, the method can further include detecting a presence of maintenance personnel adjacent the product dispenser based at least in part on scanning for an identifier associated with the maintenance personnel.

In some embodiments, the method can further include detecting a change in the quantity of the consumable product remaining in the product dispenser and calculating a usage rate for the consumable product.

In some embodiments, the consumable product can be a roll of paper situated in the product dispenser. Measuring the quantity of consumable product remaining in the product dispenser can include sensing a thickness of the roll of paper.

In some embodiments, sensing the thickness of the roll of paper can include measuring a distance between a time-of-flight sensor to an outer surface of the roll of paper.

In some embodiments, sensing the thickness of the roll of paper can include measuring a vibration signal using an accelerometer sensor. The vibration signal can be associated with dispensing of the paper from the product dispenser.

In some embodiments, the method can further include detecting opening or closing of the product dispenser using a sensor unit mounted on the product dispenser. The sensor unit can include an accelerometer sensor configured to detect vibration signals associated with opening or closing of the product dispenser, a light sensor configured to detect light intensity change associated with opening or closing of the product dispenser, and a pressure sensor configured to detect pressure disturbance associated with opening or closing of the product dispenser.

In some embodiments, the method can further include transmitting control signals to the product dispenser to turn on an indicator when the quantity of consumable product remaining in the product dispenser falls below a specified threshold.

Certain embodiments of the disclosure also concern a system for integrated cleaning service management. The system can include a dispenser configured for dispensing a consumable product. The dispenser can include a cover movable between an open position and a closed position. The system can also include a sensor module comprising a beam emitter and a beam receiver. The sensor module can be coupled to the dispenser such that when the cover is moved to the open position the dispenser is accessible for maintenance, and when the cover is moved to the closed position the beam emitter and the beam receiver are oriented toward a mounting portion configured to mount a roll of the consumable product in the dispenser.

In some embodiments, the beam emitter can be configured to emit a first signal toward the consumable product and the beam receiver can be configured to detect a second signal. The second signal can be generated when the first signal is reflected by an outer surface of the consumable product. The sensor module can be configured to measure a distance between the senor module and the outer surface of the consumable product based on a pulse transit time measured between emitting the first signal and detecting the second signal.

In some embodiments, the first signal emitted by the beam emitter can span an angle along its path. The angle can range between 25 degrees and 30 degrees.

In some embodiments, the system can be further configured to measure a quantity of consumable product remaining in the dispenser based at least in part on the distance measured between the sensor module and the outer surface of the consumable product.

In some embodiments, the system can further include a remote computing platform in wireless communication with the sensor module. The remote computing platform can be configured to determine a schedule for servicing the dispenser based at least in part on the quantity of consumable product remaining in the dispenser.

In some embodiments, the remote computing platform can be further configured to detect an early depletion event associated with the dispenser and update a schedule for servicing the dispenser based on detection of the early depletion event.

In some embodiments, the dispenser can be one of a plurality of dispensers and the remote computing platform can be configured to maintain a master schedule comprising a plurality of schedules. Each schedule can define service for a corresponding dispenser. The remote computing platform can be further configured to detect one or more early depletion events associated with the plurality of dispensers and update the master schedule based at least in part on the number of detected early depletion events.

In some embodiments, the sensor module can further include an accelerometer sensor configured to detect a vibration associated with dispensing of the consumable product from the dispenser and calculate a quantity of dispensed consumable product based on the detected vibration.

In some embodiments, the sensor module can further include an accelerometer sensor configured to detect a vibration, a light sensor configured to detect light intensity change, and a pressure sensor configured to detect pressure disturbance. The sensor module can be further configured to detect opening or closing of the dispenser based on the detected vibration, the light intensity change, and the pressure disturbance.

Certain embodiments of the disclosure further concern a system for integrated cleaning service management. The system can include a sensor module configured to monitor a quantity of a consumable product remaining in a dispenser, and a remote computing platform in wireless communication with the sensor module. The remote computing platform can be configured to determine a schedule for servicing the dispenser based at least in part on the quantity of the consumable product remaining in the dispenser. The sensor module can include a time-of-flight sensor having a light path extending from the time-of-flight sensor to the consumable product when the dispenser is in a closed configuration. The time-of-flight sensor can be configured to determine a thickness of the consumable product. The sensor module can further include an accelerometer sensor configured to detect a vibration associated with dispensing the consumable product from the dispenser. The quantity of consumable product remaining in the dispenser can be determined based on both the thickness of the consumable product measured by the time-of-flight sensor and the vibration detected by the accelerometer sensor.

The foregoing and other objects, features, and advantages of the disclosed technology will become more apparent from the following detailed description, which proceeds with reference to the accompanying figures.

DETAILED DESCRIPTION

The present disclosure pertains to systems and methods for monitoring consumables in facilities such as restrooms, predicting when maintenance will be needed, and coordinating or scheduling such maintenance.

The "smart" connected restroom systems disclosed herein can use wireless "internet of things" (IoT) sensors to monitor quantity and/or usage of consumables such as paper towels, toilet paper, tissue paper, soap, etc., to provide insight into the physical condition and remaining supply of consumables in one or more restrooms. Data from sensors in the restrooms can be provided to a software platform operating on, for example, one or more processors in a server environment, which can plan and react in real time to service needs of a facility or restroom, such as by generating a maintenance schedule. The real time connectivity provided by the wireless sensors described herein can enable remote monitoring of physical dispensers in a facility or restroom. The software can use data provided by the sensors to provide predictive analysis and generate schedules to reduce waste (e.g., by increasing the proportion of consumable materials used before replacement), and improve the quality of service to end users. The systems described herein can also be configured to monitor the health of the sensor units (e.g., battery condition, transceiver functionality, etc.), and report back to a system administrator or to the remote software platform when maintenance may be required. The systems described herein can also be configured to remotely change operational settings of the products dispensers to control the timing, quantity, etc., of the product dispensed.

Multi-Level Network

Certain embodiments of the systems and methods disclosed herein can utilize wireless connectivity (e.g., low power radio networks) to transmit sensor data from a device or facility to be monitored (e.g., a restroom) to a remote computing platform where the data can be analyzed by a facilities monitoring application or platform. Data can also be analyzed and provided to users by, for example, a dashboard or other user interface of the remote computing platform. FIG. 1 illustrates a representative example of a multi-level device network topology 10 including a remote computing platform or server environment such as a cloud computing platform 12 (also referred to as a "remote computing platform"), a primary or master node 14, a plurality of sub nodes, secondary nodes, data collection nodes, or local area nodes 16 (also referred to collectively as a "local area gateway"), and a plurality of sensors 18. The sensors 18 can be configured to transmit and/or receive data and/or instructions to at least one of the local area nodes 16. The local area nodes 16 can relay the data, signals, instructions, etc., to and from the primary node 14, which can be in communication with the remote computing platform 12 over a network such as a wireless cellular network, a wired network (e.g., an ethernet network), and/or through internet infrastructure.

In certain embodiments, the primary node 14 can be a router, a modem, a server, or other device that allows data to flow into and out of the network. In certain embodiments, the local area nodes 16 can be wireless transceivers or routers. Connectivity between the various devices of the network can be provided by the building owner or operator on the premises where the node 14 is located.

The local area gateway 16 can operate in between the sensors 18 and the primary node or building gateway 14 in a repeater configuration. For example, the local area nodes 16 can listen to the sensors 18, receive data packets, and retransmit the packets to the building gateway 14. The primary node 14, in turn, can transmit the sensor data to one or more applications running on the remote computing platform 12.

In certain embodiments, the local area gateway 16 can comprise multiple wireless technologies to establish a link between the sensors 18 and the primary node 14. For example, a first wireless technology can be implemented as a backhaul link to transfer data between the primary node 14 and the local area gateway 16. In certain embodiments, sub-GHz radio frequencies such as 433 MHz, 868 MHz, and/or 915 MHz can be used. In certain implementations, such frequencies can travel relatively long distances and are able to penetrate through walls and building structure. In certain embodiments, the different wireless technologies can be implemented on separate devices, and/or one or more devices in the network can comprise multiple wireless technologies and/or standards.

A second wireless technology, which can be implemented at the level of the local area gateway 16, can provide local connectivity to the sensors 18. This connectivity can be accomplished by, for example, a relatively low-power wireless network, such as a local or personal area network (e.g., Bluetooth® Low Energy, Bluetooth® Smart, Thread, etc.), a low-power wide area network such as LoRa™, any of various networks operating according to the IEEE 802.15.4 standard for low-rate wireless networks, or any other suitable wireless network protocol. The foregoing wireless networks and other equivalent networks are termed herein "low-energy" or "low-power" wireless networks. Such low-power wireless networks are often designed for relatively low data transmission rates over relatively short distances, which can promote increased battery life for devices such as battery-operated sensors 18.

Figure 2:
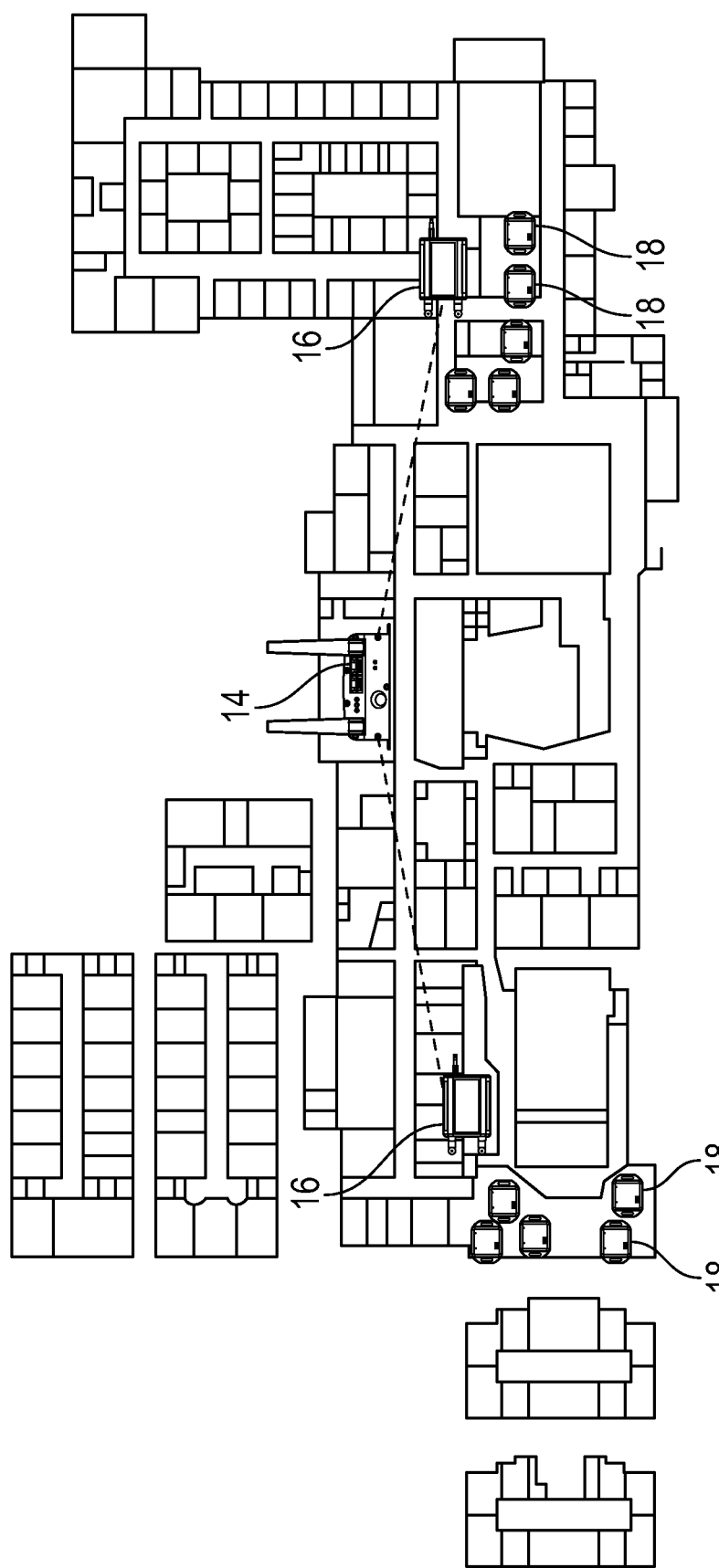
FIG. 2 illustrates an example of a multi-level device network deployed in a building in which a central building gateway acts as a backbone for connectivity and connects to local gateways, which communicate with individual sensor nodes.

In field applications in which there can be a variety of building materials and associated propagation characteristics, it can be advantageous to deploy multiple different wireless technologies in order to adapt and maintain reliable communication links between all devices. FIG. 2 illustrates a representative example of a floor plan layout of a building including a building gateway 14 wirelessly connecting multiple local nodes 16 located throughout the facility, which in turn are able to communicate with multiple sensors 18 within restrooms or other areas of the building.

The primary node 14 can be configured to aggregate data from downstream devices (e.g., the nodes 16) and transmit it to the remote computing platform. The local nodes 16 can be configured to receive and retransmit data from the sensors 18 to the primary node 14. The sensors 18 can be configured to collect operational conditions about dispensers or appliances associated with the sensors and transmit the data to one or more local nodes 16.

Example Sensor Modules and Gateway Devices

Figure 3A:
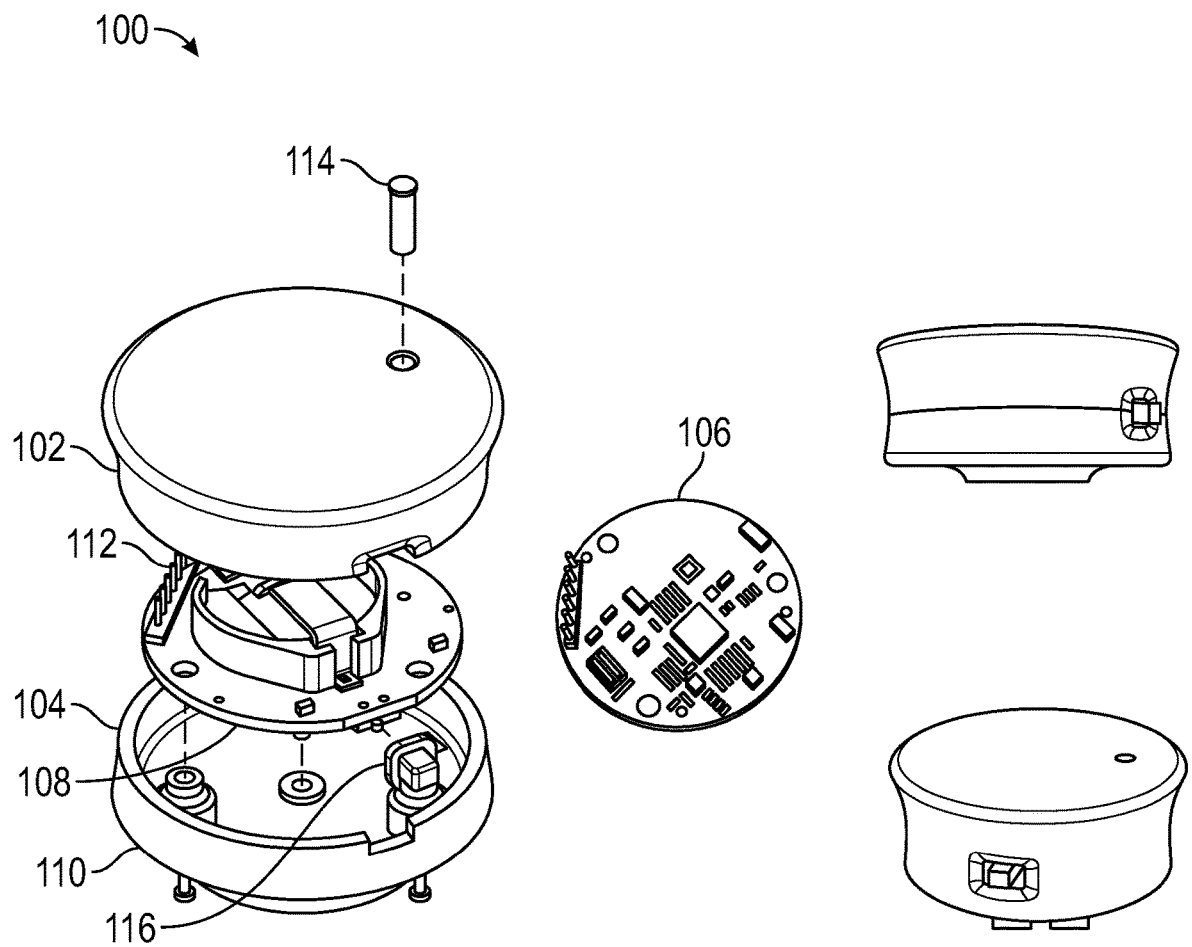
FIG. 3A is an exploded view of a wireless sensor node, according to one embodiment.

FIG. 3A illustrates a representative embodiment of a sensor unit 100 (also referred to as a "sensor module") that can be used in combination with any of the sensor networks described herein. The components of the sensor unit 100 can be housed in an enclosure. The enclosure can include a top cover or portion 102 and a bottom cover or portion 104. A first printed circuit board (PCB) 106 can be mounted to the bottom cover 104 with mounting screws 108. The top cover 102 can be affixed to the bottom cover 104 with enclosure screws 110, alternatively the top cover and bottom cover can snap together and/or can be held with clips molded into the plastic pieces.

The sensor unit can comprise a second or internal PCB 112, which can have a microcontroller and wireless technologies such as transceiver(s) thereon. Additionally, the PCB 112 can have general purpose input/output (GPIO)

connections to interface with any of various electronic devices built into existing dispenser cabinets, such as paper towel dispensers. The sensor unit 100 can be powered by an onboard battery, by connecting to an existing battery or other electrical source within a dispenser, by connecting to a battery pack external to the dispenser, and/or by a wired connection to the building's electrical system. In certain embodiments, the sensor unit 100 can use an onboard time-of-flight sensor 114 to measure distances. For example, the time-of-flight sensor 114 can be used to measure the distance between the sensor and the surface of paper wound on a core in a tissue dispenser or towel dispenser. In one example embodiment, the time-of-flight sensor 114 can include a light transmitter/source (also referred to as a "beam emitter") and a light receiver (also referred to as a "beam detector" or "beam receiver"). The light transmitter can emit light (which can also be referred to as a "first signal"), which can be reflected by an object (e.g., a roll of tissue in a tissue dispenser). The reflected light (which can also be referred to as a "second signal") can be detected by the light receiver. Based on the measured pulse transit time (i.e., the duration between the time of emitting the light and time of receiving the reflected light), a distance between the time-of-flight sensor 114 and the object can be determined, as described further below. The data measured by the time-of-flight sensor 114 can be used by the system to determine, for example, the diameter of the paper roll, and thereby the quantity of product remaining in the dispenser. Data collected at intervals and stored by the system can also be used to determine parameters such as the rate of consumption, and/or when to schedule maintenance. Such time-of-flight sensors can also be used to measure the height, level, or quantity of contents in waste bins, the quantity of soap in soap containers/dispensers, etc. The time-of-flight sensor can comprise, for example, a beam emitter such as a light-emitting diode (LED), an ultrasonic beam emitter, a laser, an infrared light source, etc., and a corresponding receiver or beam detector configured to detect a signal returning or reflected from the surface of the consumable product to be detected.

The sensor unit 100 can also include a power/reset button 116, which can be used to reset and/or program the sensor module. When a sensor such as the sensor unit 100 is removed from the shipment packaging, it can be stored in a sleep/dormant state in order to preserve the onboard battery life. The installing personnel can press the power/reset button 116 to initialize/wake up the sensor module 100 for programming and/or placement inside of a dispenser.

Using the low-power radio module of the sensor unit 100, it is possible to detect employees servicing a restroom or dispenser in which the sensor is installed. For example, such personnel can wear an ID badge detectable by interrogation of the badge with a low-power radio signal, e.g., based on the radio-frequency identification (RFID) technology. This function can be used to determine compliance of personnel with predetermined cleaning schedules and/or routes. For example, when the sensor detects that a refill of a consumable is occurring, it can scan for an identifier of the maintenance personnel such as a badge number, and record the user associated with the task. This identifier or record can be transmitted back to the remote computing platform and added to a database of metrics of cleaning compliance.

Figure 3B:
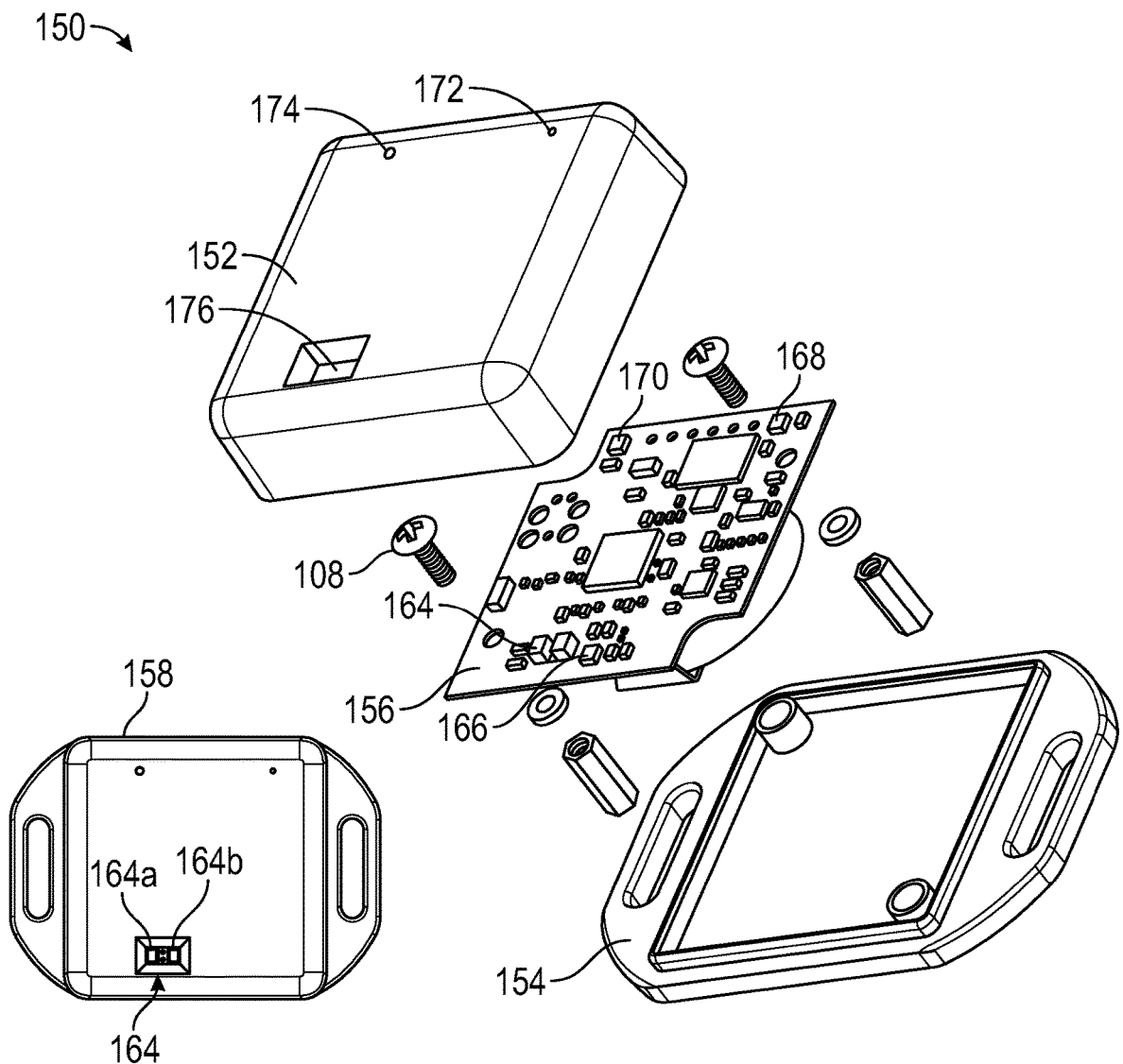
FIG. 3B is an exploded view of a wireless sensor node, according to another embodiment.

FIG. 3B illustrates another embodiment of a sensor unit 150 having a different form factor than the sensor unit 100. As shown, the sensor unit 150 includes a PCB 156 enclosed within a housing 158 defined by a top cover 152 and a bottom cover 154. In some embodiments, the PCB 156 can integrate circuits embedded in both PCB 106 and 112 described above. Similarly, the PCB 156 includes a time-of-flight sensor 164 (including a light transmitter 164a and a light receiver 164b) which can be exposed to outside of the housing 158 through an aperture 176 located on the top cover 152.

In addition, the sensor unit 150 can include at least one accelerometer sensor 166, which can be embedded within a chip on the PCB 106. In certain embodiments, the sensor unit 150 can include a pressure sensor 168 configured to measure ambient pressure surrounding the pressure sensor 168. In the depicted embodiment, the sensor unit 150 can also include a light sensor 170 configured to measure darkness/brightness of the environment surrounding the light sensor 170. The pressure sensor 168 and the light sensor 170 can be exposed to outside the housing 158 through respective apertures 172, 174 located on the top cover 152. In another embodiment, the sensor unit 150 does not have a stand-alone light sensor 170. Instead, the time-of-flight sensor 164 can be configured to measure both dimensions (e.g., the diameter of a paper roll) and the darkness/brightness of the surrounding environment. In certain embodiments, the sensor unit 100 of FIG. 3A can also include one or more of the accelerometer sensor, pressure sensor, and the light sensor described above.

Figure 4A:
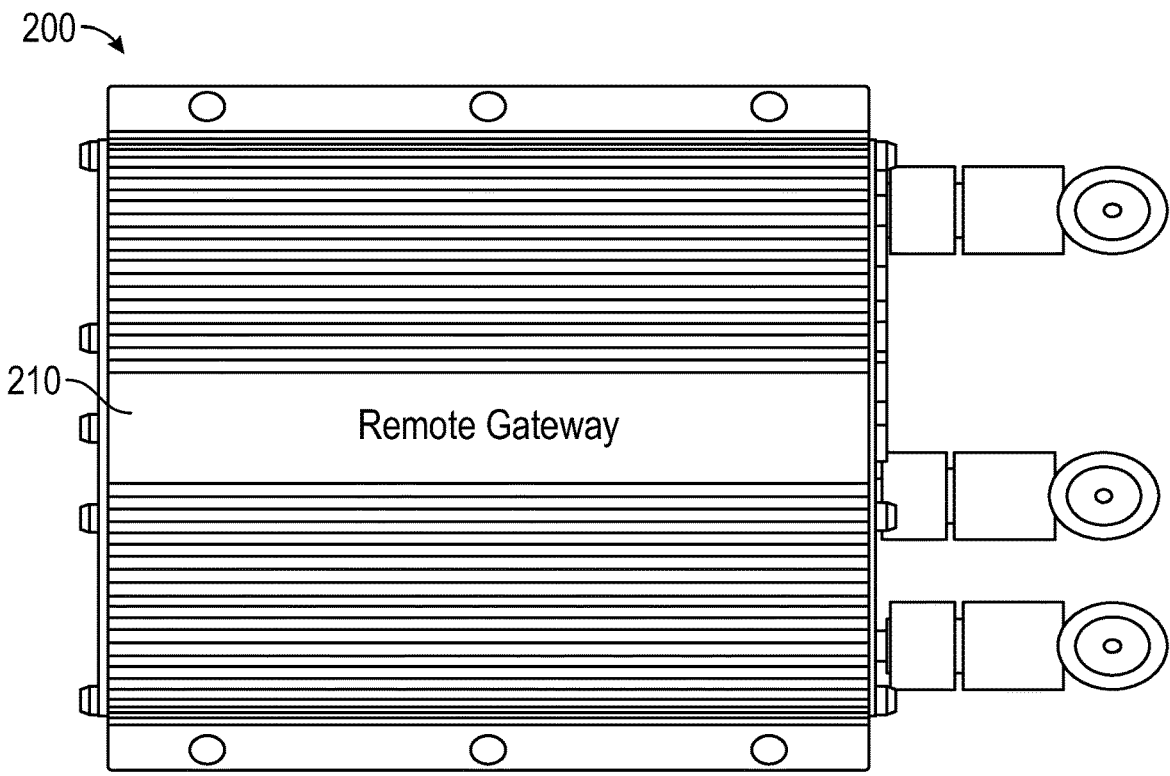
FIG. 4A shows a top view of a master gateway, according to one embodiment.
Figure 4B:
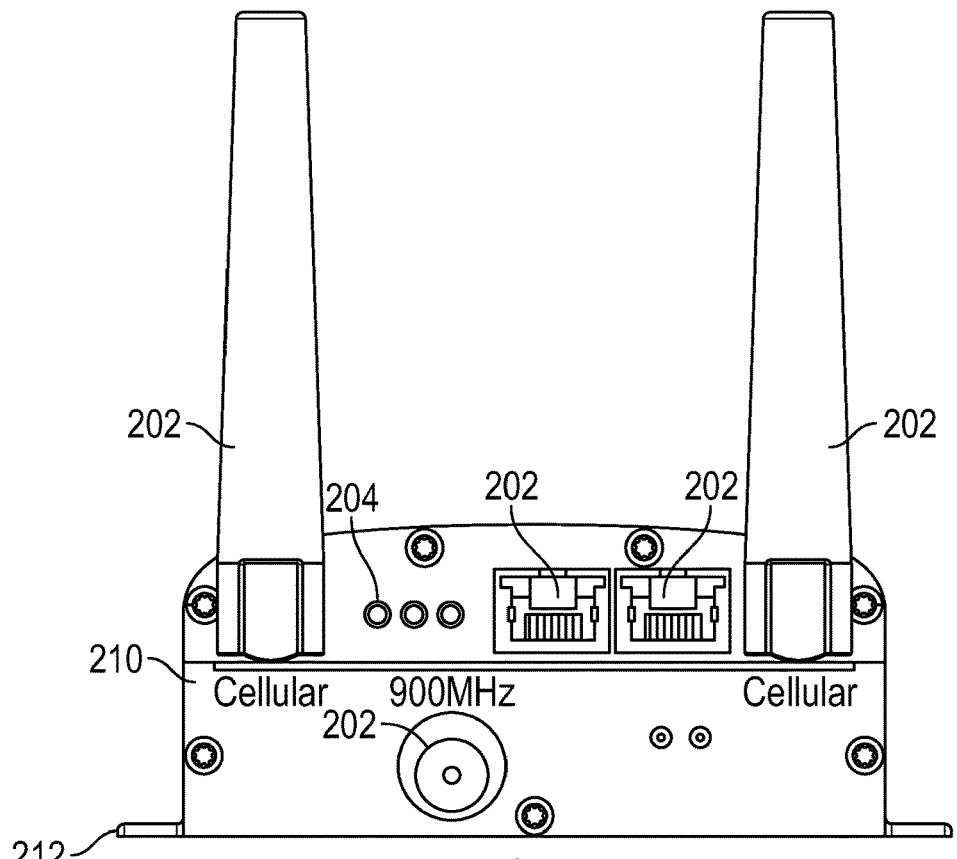
FIG. 4B shows a front view of the master gateway of FIG. 4A.

FIGS. 4A-4B illustrate a representative example of a cellular gateway module/transceiver 200, which can be configured to operate as the primary or master node 14 in the network shown in FIG. 1. The gateway module 200 can include connections on the outside of the case or enclosure 210 for power, antenna and Ethernet indicated generally at 202. The gateway module can also have LED indicators 204, which can indicate status of the device's condition (e.g., whether it is powered or transmitting data). The device can also include a processing/cellular transceiver PCB board located inside the enclosure 210. A battery can also be included as a backup to help ensure that the gateway module remains operational through any power interruptions. The components can fit inside of the plastic or polycarbonate or metal enclosure 210, which can include a mounting bracket 212 to mount the device at a specified location.

Figure 4C:
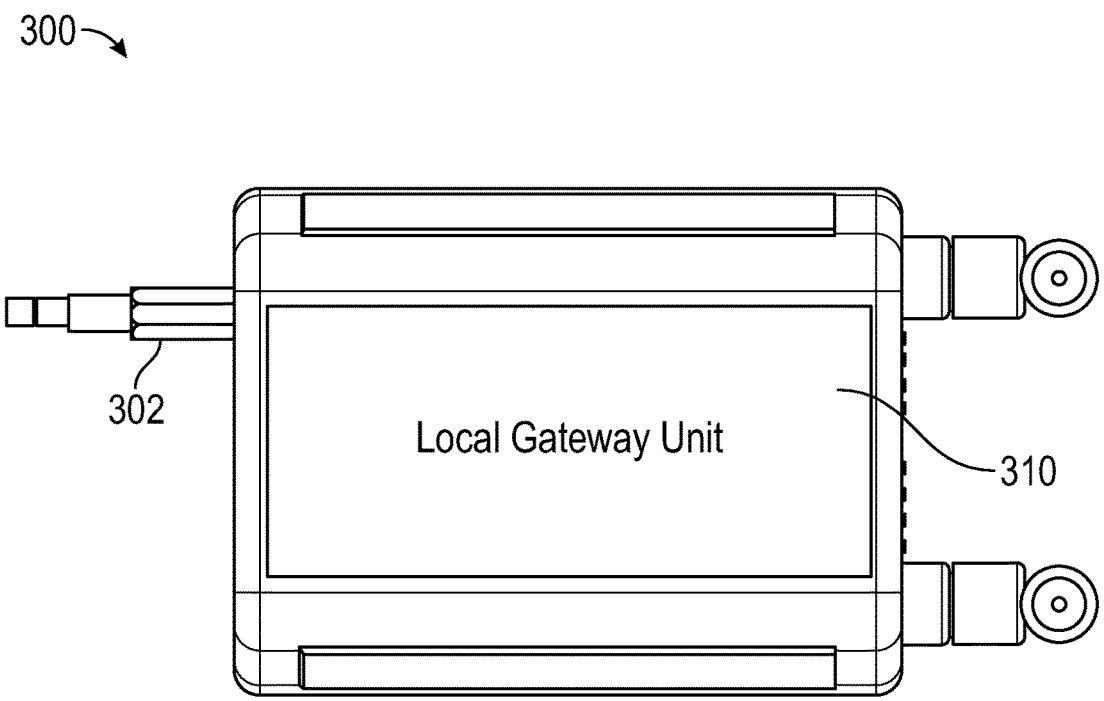
FIG. 4C shows a top view of a local gateway, according to one embodiment.
Figure 4D:
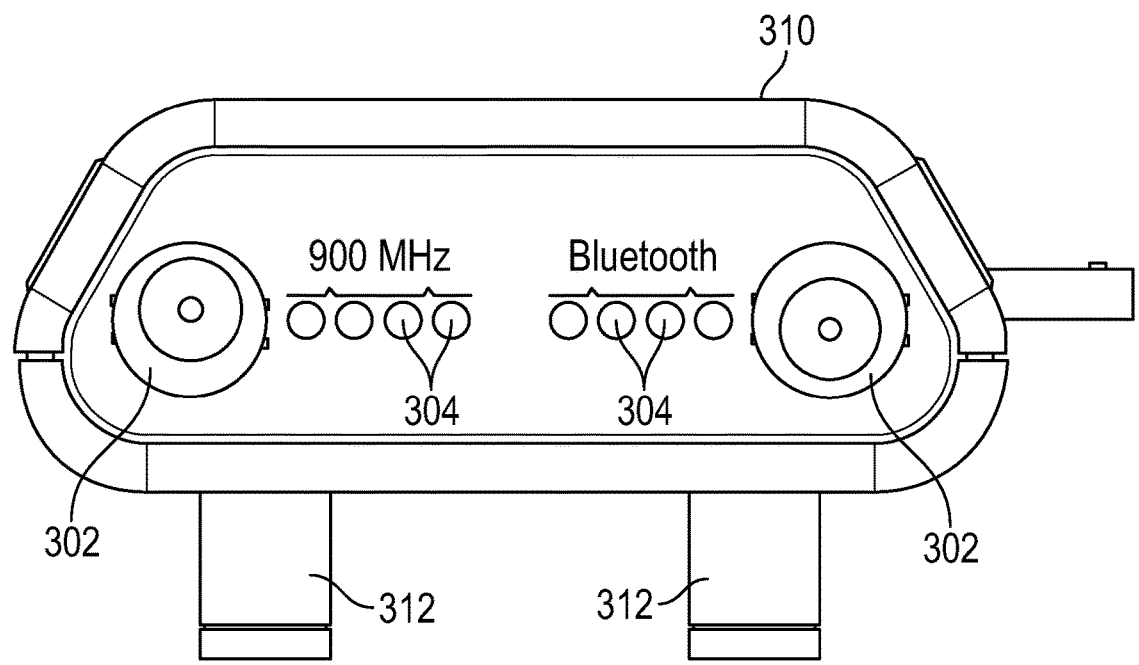
FIG. 4D shows a front view of the local gateway of FIG. 4C.

FIGS. 4C-4D illustrate a representative example of another low-power radio transceiver and processing device configured as a local gateway 300. A network such as the network 10 of FIG. 1 can include a plurality of local gateways 300 in the role of the local area nodes 16, operating as repeaters and pass-through gateways in communication with sensor nodes and rebroadcasting the data to the primary node 14. In certain embodiments, the cellular gateway 200 and the local gateway 300 can have a similar construction but can implement different onboard radio technology to broaden the scope of the wireless topology. The local gateway 300 can comprise connections external to its enclosure 310 for power and an antenna indicated generally at 302, as well as onboard LED indicators 304. The device can include a PCB located inside the enclosure 310 and the PCB can include Bluetooth® and/or sub-GHz wireless transceiver technology. The local gateway 300 may also implement Ultra Narrow Band (UNB) telecommunication systems, such as SIGFOX™. The device can also have a battery. The enclosure 310 and the mounting bracket 312 can be used to house the internal components as well as mount the enclosure to a selected surface.

Example Sensor Placement

Figure 5:
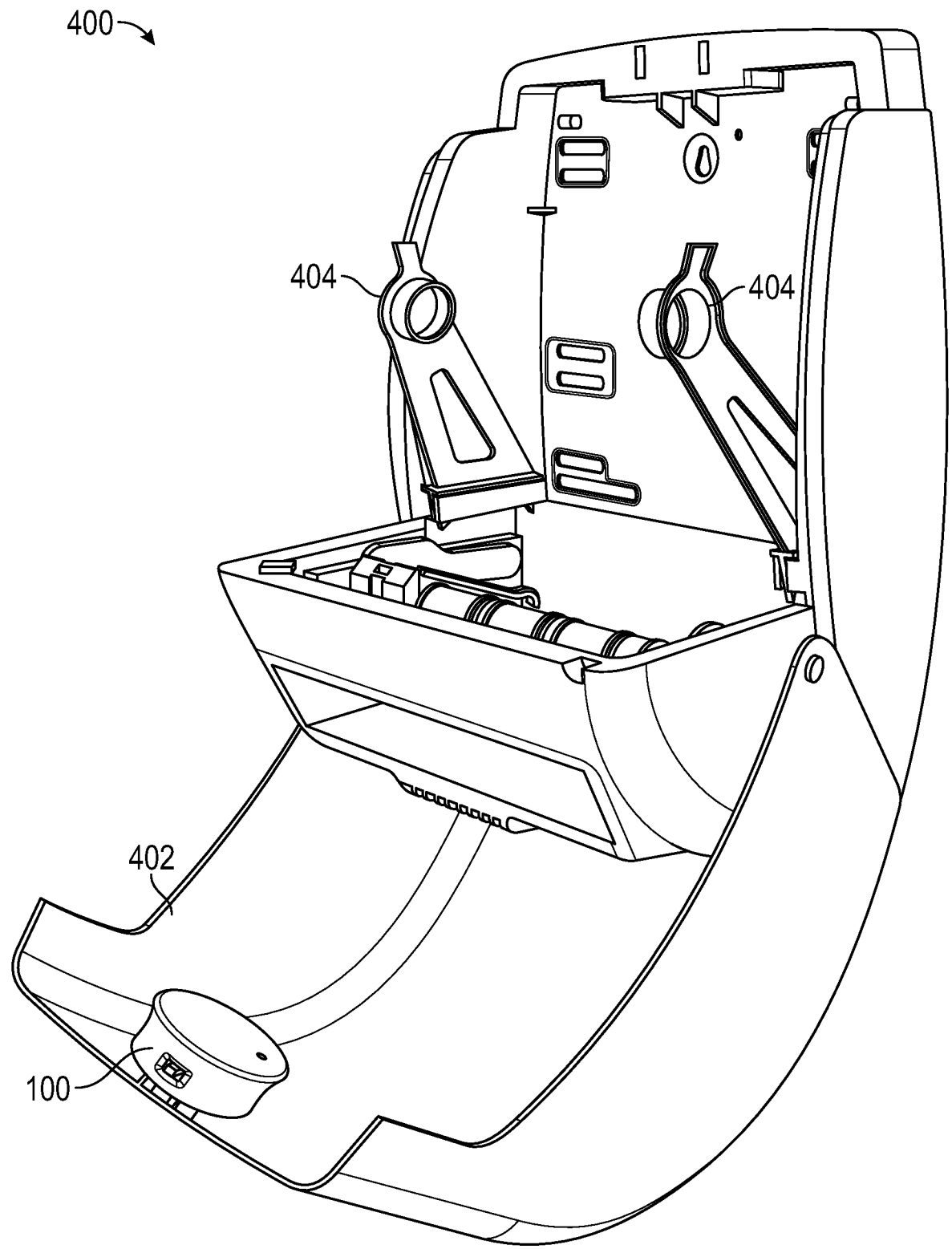
FIG. 5 is a perspective view illustrating a sensor module mounted inside of a towel dispenser.

In certain embodiments, the sensor unit 100 (or 150) can be placed inside a dispenser unit, such as a paper towel dispenser, at a location where it can sense the roll of paper installed in the dispenser and provide a measurement corresponding to the level or amount of paper remaining on the roll. FIG. 5 shows an example of a paper towel dispenser 400 in which a sensor unit 100 (or 150) is placed on an inside surface of the top of the dispenser cover 402. The dispenser cover 402 can be configured to swing or pivot upwardly to a closed position such that the sensor unit 100 (or 150) is positioned above a paper towel roll (not shown) mounted to a mounting portion configured as mounting arms 404, with the beam emitter and the beam receiver oriented toward the paper towel roll (and/or toward the arms 404). When the cover 402 is in the open position, the sensor unit 100 (or 150) can be disposed below the body of the enclosure and forward of the enclosure for ease of access. The sensor unit 100 (or 150) can also be placed in the back portion, the bottom portion, as well as the sides of the dispenser, or multiple sensors can be placed at different locations within the dispenser. For example, in certain embodiments the sensor unit 100/150 can be disposed/mounted on the rear wall of the enclosure, and aligned with the end portions of the mounting arms 404. In yet other embodiments, the sensor unit 100 (or 150) can be positioned on the exterior of the enclosure. Measurement beams (e.g., light, sound, radio waves, etc.) can be directed into the interior of the enclosure to measure the quantity of product either through the walls of the enclosure, or through a window, opening, aperture, etc., that is transparent to the beam.

Figure 6A:
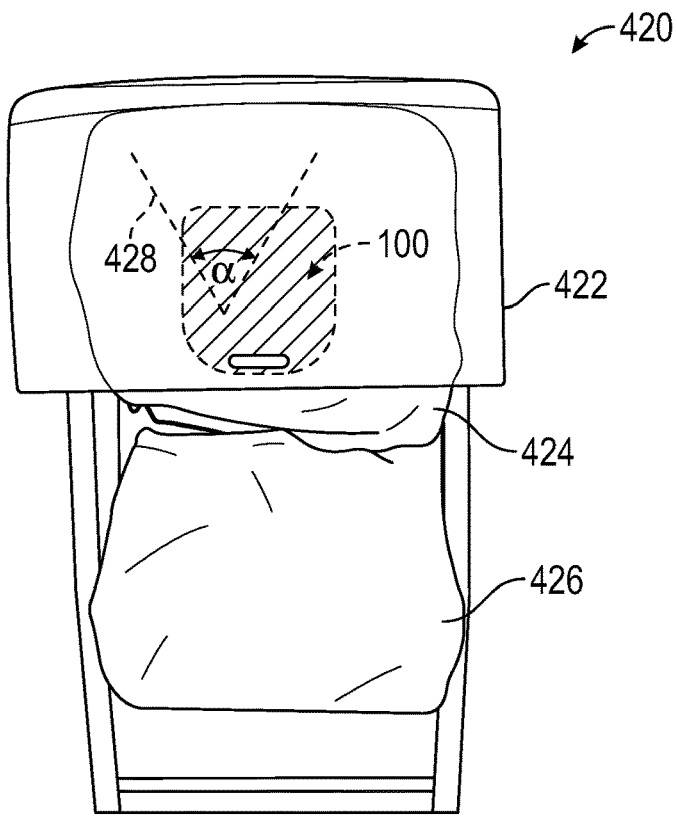
FIG. 6A illustrates an exemplary location for mounting a sensor module inside of a tissue dispenser, according to one embodiment.
Figure 6B:
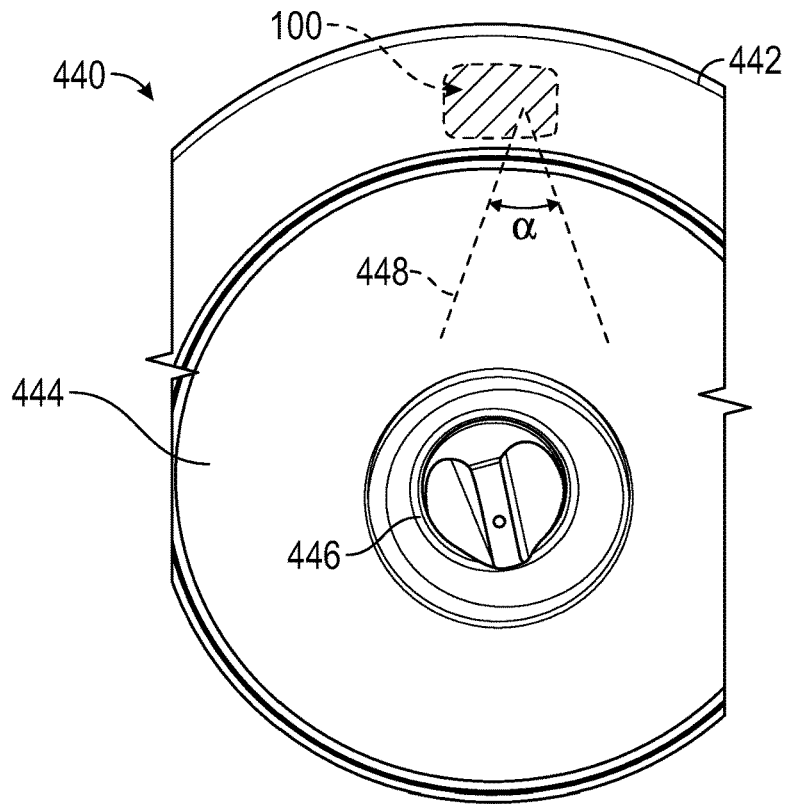
FIG. 6B illustrates an exemplary location for mounting a sensor module inside of another tissue dispenser, according to one embodiment.

As examples, FIGS. 6A-6B show two sensor placement locations in toilet paper dispensers where the sensors have a line-of-sight or optical axis incident on the roll of toilet paper and can detect the outer diameter of the roll of toilet paper. In FIG. 6A, the sensor unit 100 (or 150) is placed on a front cover 422 of a toilet paper dispenser 420 which is configured to hold a first roll of toilet paper 424 and a second backup roll of toilet paper 426. The time-of-flight sensor 114 (or 164) has a light path that extends from the front cover 422 (e.g., horizontally) and onto a mid-portion (e.g., the stub tube or central axis) of the first toilet paper roll 424. Thus, the distance between the time-of-flight sensor 114 (or 164) to the outer surface of the first toilet paper roll 424 can be measured, based on which an outer diameter of the first toilet paper roll 424 (as well as the amount of used and remaining toilet paper (e.g., segments) on that roll) can be derived. In FIG. 6B, the sensor unit 100 (or 150) is placed on a top cover 442 of another toilet paper dispenser 440 which is configured to hold another roll of toilet paper 444. The time-of-flight sensor 114 (or 164) has a light path 448 that extends from the top cover 442 (e.g., vertically) and onto a mid-portion, such as the stub tube or core 446, of the toilet paper roll 444. Thus, the distance between the time-of-flight sensor 114 (or 164) to the outer surface of the toilet paper roll 444 can be measured, based on which an outer diameter of the toilet paper roll 444 (as well as the quantity of used and remaining toilet paper on that roll) can be derived.

It is to be understood that the horizontal and vertical light paths 428 and 448 are merely shown for illustrative purposes, and the time-of-flight sensor 114 (or 164) can have a light path that is oriented in different directions so long as it passes through a mid-portion or central axis of a target object (e.g., a roll of toilet paper, a roll of paper towel, a container of liquid soap, etc.).

In some embodiments, the light emitted from the time-of-flight sensor 114 (or 164) can span an angle $\alpha$ along the light paths 428 and/or 448, resulting in a cone within which reflected light of the measurement beam can be detected. In certain embodiments, the angle $\alpha$ can range from about 0 degree to about 45 degrees. In some embodiments, the angle $\alpha$ ranges from about 25 degrees to about 30 degrees. In one specific embodiment, the angle $\alpha$ is about 27 degrees. By allowing the emitted light to span a certain angle $\alpha$, the time-of-flight sensor 114 (or 164) can be configured to measure the distance between the time-of-flight sensor and the light-reflecting surface of the target object even if the time-of-flight sensor is not perfectly aligned with the mid-portion or central axis of the target object. For example, when the time-of-flight sensor 114 (or 164) has a slight offset relative to the mid-portion of the toilet paper roll 424 or 444 described above, with a proper calibration, the time-of-flight sensor 114 (or 164) can be configured to still accurately measure the outer diameter of the toilet paper roll 424 or 444 so long as the mid-portion of the toilet paper roll is within the angled light paths 428 or 448. The configurations, orientations, and operations of the time-of-flight sensors described above can also be applicable to towel dispensers, soap dispensers, and/or other types of consumables dispensers.

Example Method of Monitoring Quantity and Usage of Consumables

Figure 12:
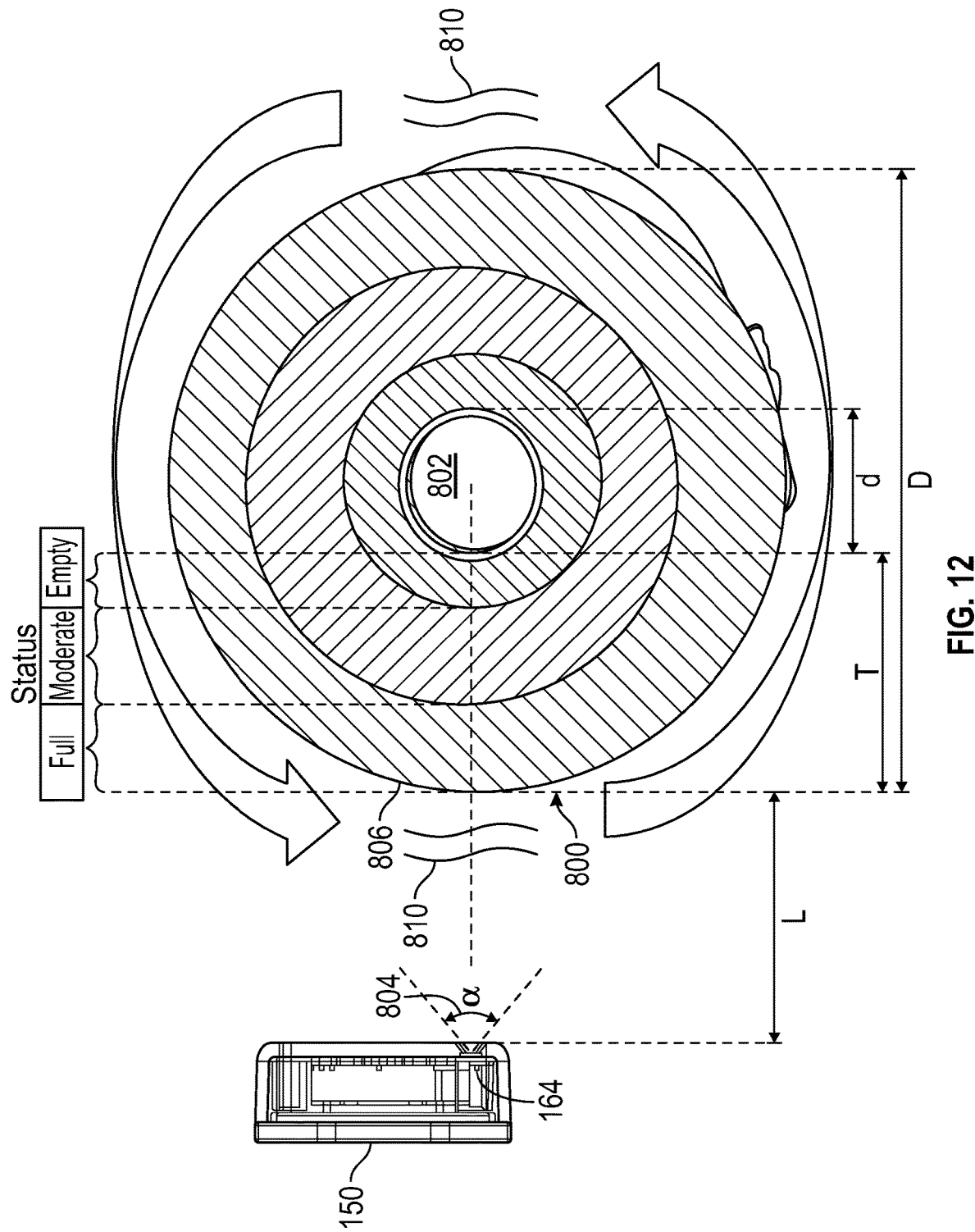
FIG. 12 is a schematic illustration of detecting paper levels in a tissue dispenser, according to one embodiment.
Figure 13:
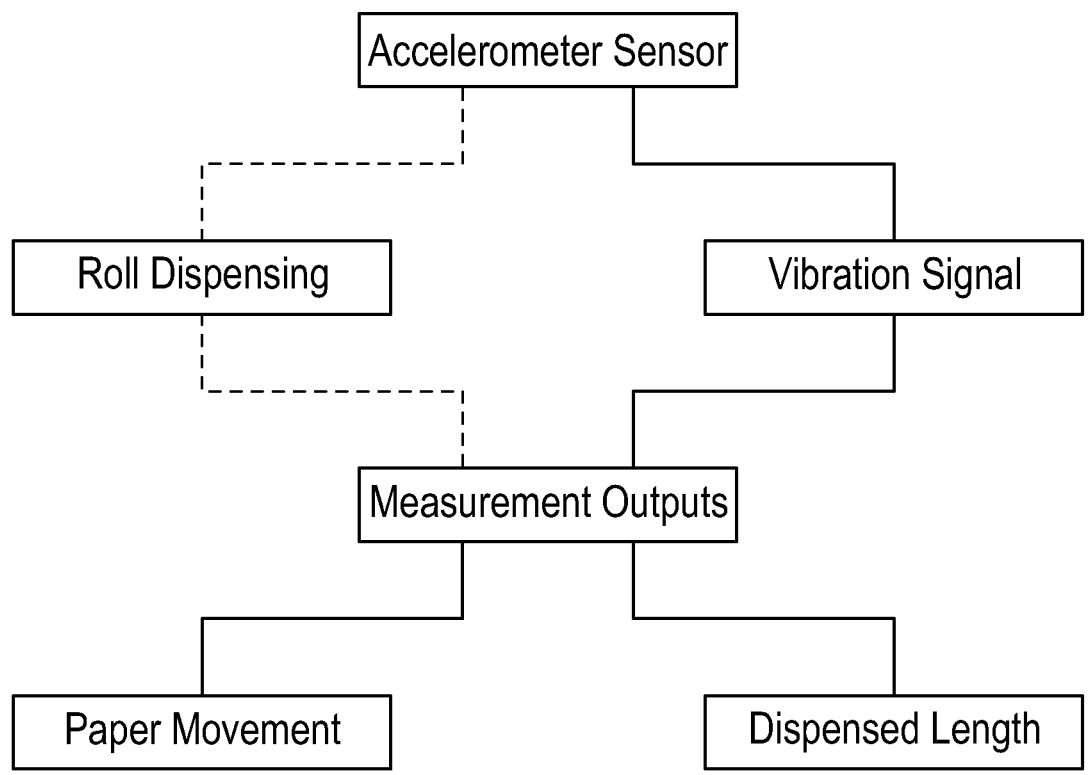
FIG. 13 is a block diagram illustrating a method of detecting a length of dispensed paper by a tissue dispenser using an accelerometer sensor, according to one embodiment.

In certain embodiments, multiple sensors can be employed to monitor the quantity and usage of consumables, such as paper towels, toilet paper, tissue paper, soap, etc. In the following examples, the sensor unit 150 is used as an example to illustrate the concept, although it is to be understood that the sensor unit 100 can also be used when it is integrated with corresponding sensors (e.g., time-of-flight sensor, accelerometer sensor, pressure sensor, the light sensor, etc.) for relevant signal detections. As an example, FIGS. 12-13 illustrates the concept of detecting tissue paper levels in a tissue dispenser using both a time-of-flight sensor and an accelerometer sensor, according to one embodiment. As described herein, any calculations described below can be performed locally (e.g., within the sensor unit 150) or remotely (e.g., by the remote computing platform 12).

Example Method of Measuring Dispensed and Remaining Consumables Using Time-of-Flight Sensor As shown in FIG. 12, the sensor unit 150 can be placed on a tissue dispenser (not shown) which holds a roll of tissue paper 800. The time-of-flight sensor 164 has a light path 804 extending from the time-of-flight sensor 164 to a stub tube/core 802 of the roll of tissue paper 800. Thus, the light emitted by the light transmitter 164a can be reflected by an outermost surface 806 of the roll of tissue paper 800, and the reflected light can be detected by the light receiver 164b. Based on the measured pulse transit time (e.g., the duration between emitting the light and receiving the reflected light), a distance (L) between the time-of-flight sensor 164 and the outermost surface 806 of the tissue paper roll 800 can be determined.

In the depicted example, a thickness (T) of the tissue paper can be related to the diameter (D) of the tissue paper roll 800 by the following equation: $T=(D-d)/2$, wherein d is a diameter of the stub tube 802 over which the tissue paper is wrapped. Generally, the diameter (d) of the stub tube 802 can be prespecified or premeasured. Because the distance from the time-of-flight sensor 164 to the central axis of the stub tube 802 is fixed (i.e., the sum L+T is a constant) can be predetermined (or at least it can be pre-calibrated), if the distance L can be measured, the thickness (T) of the tissue paper as well as the diameter (D) of the tissue paper roll (or its radius D/2) can also be determined. When a full roll of tissue paper 800 is installed in the tissue dispenser, the initial thickness T0 (i.e., T=T0) of the tissue paper is generally known based on specification of the tissue paper (e.g., based on the thickness of a single sheet of tissue paper and the number of sheets per roll). Thus, after mounting the sensor unit 150 to the tissue dispenser, the initial distance L0 (i.e., L=L0) between the time-of-flight sensor 164 and the outermost surface 806 of the newly installed tissue paper roll 800 is also known or at least can be pre-calculated.

Dispensing of the tissue paper can lead to a decrease in thickness of the tissue paper remaining on the stub tube and a corresponding increase in the distance between the time-of-flight sensor 164 and the outermost surface 806 of the tissue paper roll 800. Thus, by measuring the increase of L (i.e., ΔL), the decrease in T (i.e., ΔT) due to dispensing of tissue paper can be obtained, i.e., ΔT=ΔL. Thus, by comparing with the initial thickness T0, the amount of tissue paper remaining in the tissue dispenser as well as the amount of tissue paper that has been dispensed can be determined (e.g., based on the length/thickness of a single sheet of tissue paper).

In certain embodiments, the status of the tissue paper roll 800 in the tissue dispenser can be continuously monitored based on measurement of L and T, and some alert signals can be generated when the measured thickness (T) is below one or more predefined thresholds. For example, the status of the tissue paper roll 800 can be classified into one of three (or more) classes: "Full," "Moderate," and "Empty," based on the measured thickness (T) of the remaining tissue paper on the stub tube 802. The "Full" status can be indicated when the ratio T/T0 is greater than or equal to a first threshold, the "Moderate" status can be indicated when the ratio T/T0 is smaller than the first threshold and larger than a second threshold, and the "Empty" status can be indicated when the ratio T/T0 is smaller than or equal to the second threshold. In some embodiments, the first threshold can range from about 60% to about 90% (e.g., 75%). In some embodiments, the second threshold can range from about 10% to about 30% (e.g., 20%). The "Full" status may suggest no attention is needed for the tissue dispenser, the "Moderate" status may suggest the tissue dispenser may need attention soon, and the "Empty" status may suggest immediate attention is needed for the tissue dispenser. The status of the tissue dispenser, which can be color coded (e.g., green color may indicate "Full" status, yellow color may indicate "Moderate" status, and red color may indicate "Empty" status), may be transmitted to a computer located on the remote computing platform 12, to effectuate a change in maintenance schedule and/or trigger a notice or issuance of a replenishment order to corresponding maintenance personnel, as described further below.

Example Method of Measuring Dispensed and Remaining Consumables Using Accelerometer Sensor In some embodiments, the dispensed and remaining tissue paper can also be measured by the accelerometer sensor 166 embedded in the sensor unit 150, either independently or in conjunction with the time-of-flight sensor 164. In some embodiments, the accelerometer sensor 166 can be configured to provide simultaneous measurements in three orthogonal directions, for analysis of all of the vibrations being experienced by the sensor unit 150.

Dispensing of the tissue paper involves rolling of the tissue paper roll 800 (as indicated by the block arrows in FIG. 12), which can generate a vibration signal 810. A plurality of metrics can be derived from the vibration signal 810, including but not limited to the amplitude of the vibration signal, the duration of the vibration signal, the dominant frequency of the vibration signal, the number and/or strength of the harmonic frequencies of the vibration signal, etc. In certain embodiments, the metrics of the vibration signal 810 can be analyzed to detect a dispensing event and differentiate it from other physical disturbance to the tissue dispenser (e.g., opening/closing the tissue dispenser, or tampering of the tissue dispenser) based on signal processing techniques such as template matching or pattern recognition, which links one or more metrics of the vibration signal to the activity of rolling the tissue paper roll 800. Detection of the dispensing event can be based on the vibration signal 810 measured by the accelerometer sensor 166 alone, or in combination with other sensors, such as the pressure sensor 168 and/or the light sensor 170, as described further below.

In one embodiment, the duration of the vibration signal 810 can be used to calculate the dispensed tissue paper based on a pre-calibrated correlation between the rotation time of the tissue paper roll 800 and the dispensed paper length. In another embodiment, both the amplitude and duration of the vibration signal 810 can be used to calculate the dispensed tissue paper based on a pre-calibrated correlation between the rotation time and force applied to the tissue paper roll 800 and the dispensed paper length. In yet a further embodiment, correlation between the detected vibration signal 810 and dispensed paper length can be established based on historical data collected by the sensor unit 150 (or a plurality of sensor units connected to the remote computing platform). For example, a regression analysis can be performed based on historical data to determine, for example, the correlation between the duration and/or amplitude of the vibration signal 810 and the dispensed paper length.

Thus, as summarized in FIG. 13, roll dispensing activity can be detected by the accelerometer sensor (e.g., 166), which can generate a vibration signal (e.g., 810). The measured vibration signals can be correlated to paper dispensing movement and calculate the dispensed paper length.

Example Method of Measuring Dispensed and Remaining Consumables Using Both Time-of-Flight Sensor and Accelerometer Sensor In some embodiments, both the time-of-flight sensor 164 and the accelerometer sensor 166 can be used to measure the dispensed and remaining consumable product (e.g., tissue paper, soap, etc.) in a dispenser. For example, each sensor (164 or 166) can independently measure the thickness (T) of the tissue paper remaining in a dispenser, and the measured thickness (T) by the two sensors 164, 166 can be averaged to calculate the ratio T/T0, based on which the status of the tissue paper roll can be determined, as described above. In some embodiments, if the thickness (T) measured by the two sensors (164, 166) deviate significantly (e.g., by a predetermined threshold), then an alert can be generated that one of the sensors (164 or 166) may need to be recalibrated.

In some embodiments, the accelerometer sensor 166 can be used to complement, validate, and/or increase measurement resolution of the time-of-flight sensor 164. For example, the time-of-flight sensor 164 can be used to measure the dispensed and remaining tissue paper in a first resolution (e.g., 1 mm) and the accelerometer sensor 166 can be used to measure the dispensed and remaining tissue paper in a second resolution (e.g., 0.1 mm) that is finer than the first resolution. Due to the disparity of resolution, the time-of-flight sensor 164 may detect a decrease of thickness T (e.g., 1 mm) only after the occurrence of multiple paper dispensing activities. Each paper dispensing activity and the corresponding dispensed paper length, however, can be detected and measured by the accelerometer sensor 166. While the accuracy of accelerometer sensor 166 may be lower than the time-of-flight sensor 164 in terms of measuring dispensed and remaining tissue paper in certain circumstances (e.g., due to some calibration issues or variations in the ways different individuals remove paper from the dispenser), the dispensed paper length measured by the accelerometer sensor 166 can be used to interpolate and increase resolution of the remaining paper thickness (T) measured by the time-of-flight sensor 164. For example, assume the time-of-flight sensor 164 measures that the thickness (T) of the remaining tissue remains 30 mm over one hour before decreasing to 29 mm. Further assume there are there paper dispensing activities detected by the accelerometer sensor 166 during that one-hour window, corresponding to three dispensed paper lengths (e.g., 0.2 mm, 0.2 mm, 0.3 mm) measured by the accelerometer sensor. The remaining paper thickness measured by the time-of-flight sensor 164 can then be interpolated within the one-hour window to be 29.8 mm, 29.6 mm, and 29.3 mm corresponding to the time of three detected dispensing activities, respectively.

Figure 14:
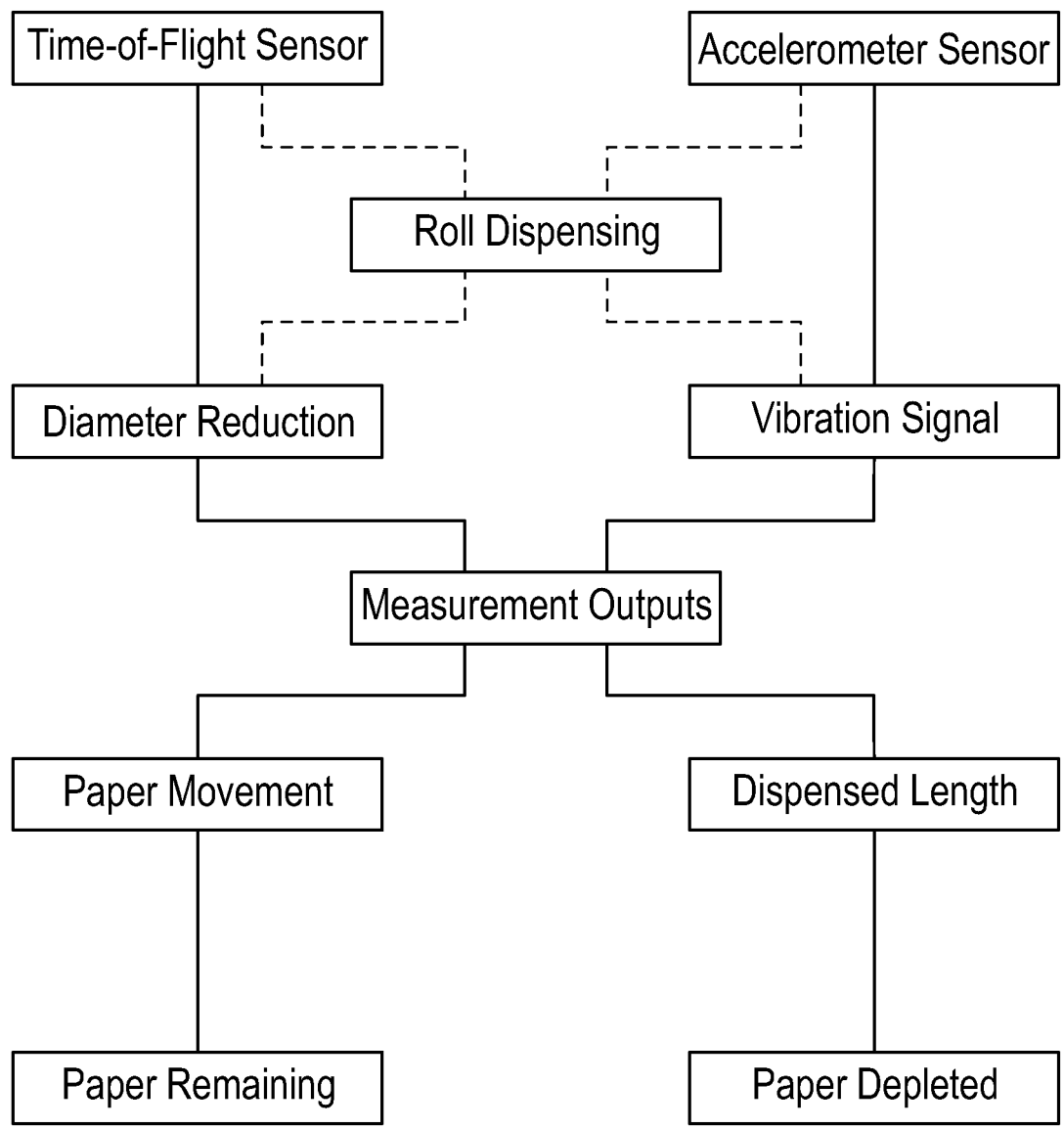
FIG. 14 is a block diagram illustrating a method of detecting paper levels in a tissue dispenser using a time-of-flight sensor and an accelerometer sensor, according to one embodiment.

Thus, as summarized in FIG. 14, roll dispensing can activate both time-of-flight sensor (e.g., 164) and the accelerometer sensor (e.g., 166), which can respectively measure diameter reduction (or thickness) of the tissue paper roll (e.g., 800) and the vibration signal (e.g., 810). Such measured signals can be combined as measurement outputs, based on which the remaining paper in the dispenser (after the paper dispensing movement) can be calculated, and the dispensed paper length (and whether the tissue paper has been depleted) can also be determined. Accordingly, in certain embodiments the accelerometer can provide data of a number of dispense events over a selected period of time, and the system can correlate the number of dispenses with the amount of product dispensed using the reduced diameter of the roll as measured by the time-of-flight sensor.

In certain embodiments, the sensor-measured consumable product that is remaining in a dispenser can be used to calculate an estimated service time (for replenishing the consumable product) or service schedule for the dispenser. For example, the estimated service time (or service schedule) can be calculated by dividing the amount of consumable product remaining in the dispenser by a usage rate for the consumable product. In one embodiment, the usage rate for the consumable product can be predefined (e.g., set to a default value based on past service data collected from all dispensers). In another embodiment, the usage rate for the consumable product can be dynamically calculated based on the history of usage of the consumable product in that specific dispenser. For example, the usage rate for the consumable product in a dispenser can be obtained by dividing a total amount of the consumable product used in the dispenser over a previous period (e.g., 1 week, etc.) by the duration of the period. In another example, linear regression analysis of the usage history data can be used to determine the usage rate. Thus, if it is detected that the quantity of consumable product remained in a dispenser is below a certain threshold such that the currently estimated service time is shorter than a previously estimated service time (or service schedule), then an early depletion event may be detected and corresponding schedule update may be triggered, as described more fully below.

Example Method of Detecting Opening, Tampering of Dispensers, or Malfunction

Figure 15:
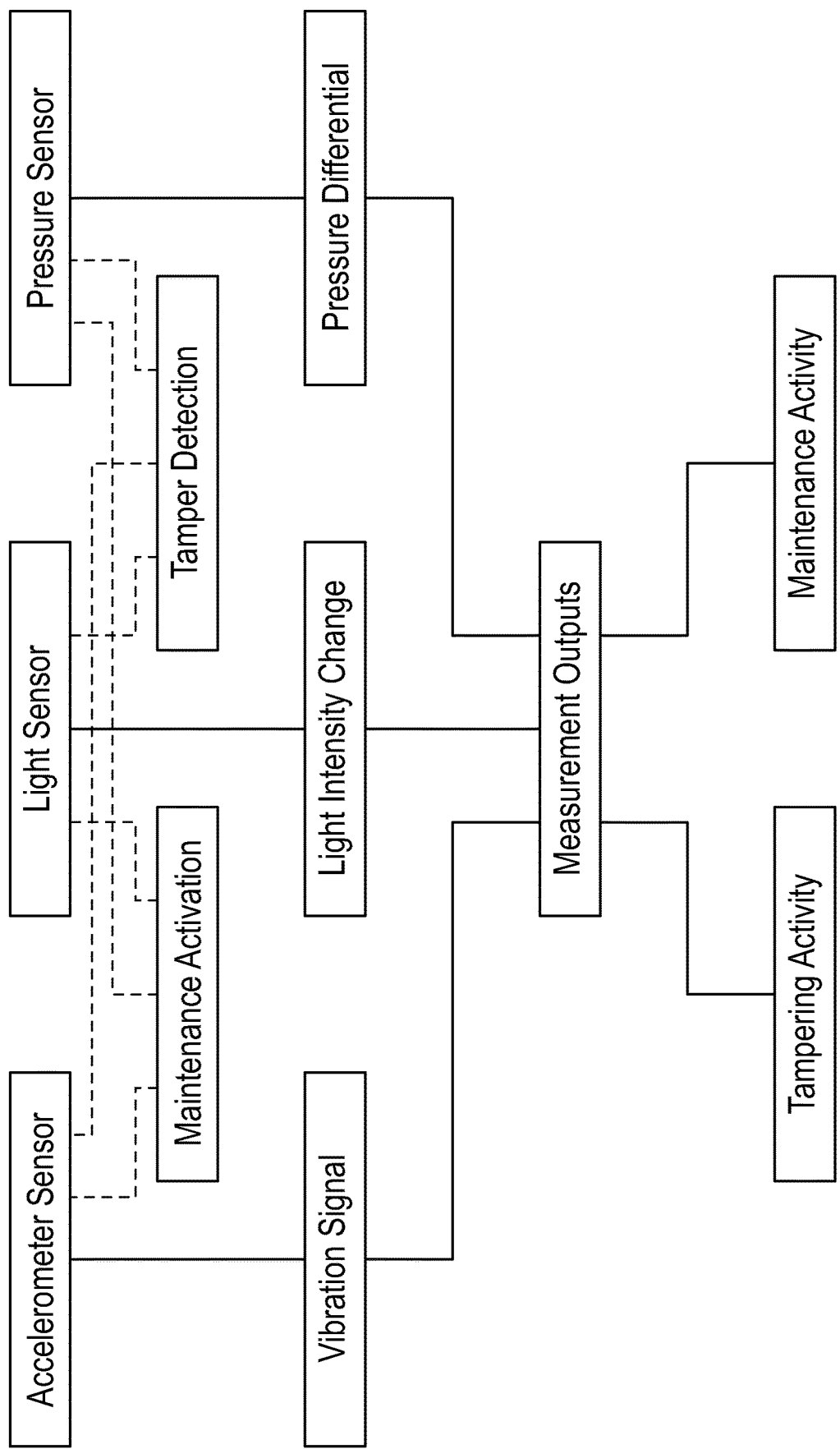
FIG. 15 is a block diagram illustrating a method of detecting maintenance activation and tampering of a dispenser using an accelerometer sensor, a light sensor, and a pressure sensor, according to one embodiment.

In some embodiments, a plurality of sensors can be used to detect opening and/or closing of a consumable dispenser during maintenance, as well as to detect tampering with the consumable dispenser. For example, FIG. 15 shows a block diagram illustrating an example method of detecting maintenance activation and tampering of a dispenser using an accelerometer sensor (e.g., 166), a pressure sensor (e.g., 168), and/or a light sensor (e.g., 170) mounted on the sensor unit (e.g., 150).

In one embodiment, opening and/or closing of the dispenser during regular maintenance can simultaneously activate the accelerometer sensor, the pressure sensor, and/or the light sensor. For example, physical vibration caused by opening/closing of the dispenser can cause the accelerometer sensor to generate a vibration signal. In addition, opening/closing of the dispenser can change the darkness/brightness of the environment surrounding the light sensor and cause it to detect a change of light intensity (e.g., the light intensity is increased when the dispenser is opened and decreased when the dispenser is closed). Further, opening/closing of the dispenser can cause local air disturbance around the pressure sensor and cause it to detect a pressure differential signal. The signals generated by the accelerometer sensor, the light sensor, and/or the pressure sensor can be combined as measurement outputs, based on which maintenance activity and tampering activity can be detected.

In certain embodiments, the accelerometer sensor, the pressure sensor, and the light sensor work in conjunction, e.g., opening and/or closing of the dispenser can be detected if the vibration signal, the light intensity change signal, and the pressure disturbance signal all indicate opening and/or closing of the dispenser. In other embodiments, a voting method can be employed. For example, opening and/or closing of the dispenser can be detected if two of three signals (e.g., the vibration signal, the light intensity change signal, and the pressure disturbance signal) indicate opening and/or closing of the dispenser.

In some embodiments, tampering of the dispenser can be detected and differentiated from normal opening/closing of the dispenser during regular maintenance activities. For example, tampering of the dispenser can cause the accelerometer sensor to generate a different vibration signal pattern (e.g., a larger amplitude and/or a longer duration) than normal opening/closing of the dispenser during regular maintenance activities (e.g., if the cabinet is forced open).

In certain embodiments, the detected opening/closing of the dispenser can be confirmed to be associated with regular maintenance activities after the detection of an ID badge of the maintenance personnel. In certain embodiments, the detected opening/closing of the dispenser can be confirmed to be caused by regular maintenance activities if the time of detected opening/closing of the dispenser is within a predefined window relative to a scheduled time of maintenance service for the dispenser. On the other hand, if an opening/closing event of the dispenser is detected, it can be classified as a tampering event if a proper ID badge of the maintenance personnel is not detected and/or if the suspected maintenance activity occurred at a time that is outside the predefined window of a scheduled maintenance service for the dispenser.

In certain embodiments, one or more of the accelerometer, pressure, and/or time-of-flight sensors can also be used to detect an equipment malfunction, such as a paper jam, a motor malfunction, etc. For example, in certain embodiments the system can determine that paper has jammed in the dispenser based on the signal from the accelerometer. In certain embodiments, the system can determine that a motorized dispenser is not dispensing product if, for example, the accelerometer detects repeated motor activations but the time-of-flight sensor determines that a corresponding reduction in product (e.g., roll diameter or soap level) has not occurred. The system can also detect a motor or gear malfunction based on a vibration signal that deviates from a historical vibration pattern associated with proper functioning.

Example Method of Maintenance Schedule Management

In certain embodiments, the sensor unit 100 (or 150) can include an indicator, such as a light-emitting diode (LED), a speaker, etc. When a particular dispenser in a restroom with multiple dispensers requires maintenance (e.g., when a quantity of product in the dispenser falls below a specified threshold, or the dispenser has been tampered with), the indicator can be turned on to identify the dispenser to maintenance personnel. For example, when the remote computing platform 12 determines that a particular dispenser requires maintenance, the platform 12 can transmit control signals to the sensor unit 100 (or 150) to turn on the indicator, allowing maintenance personnel to easily identify the dispenser from among multiple dispensers, not all of which may require maintenance at that time.

Figure 7:
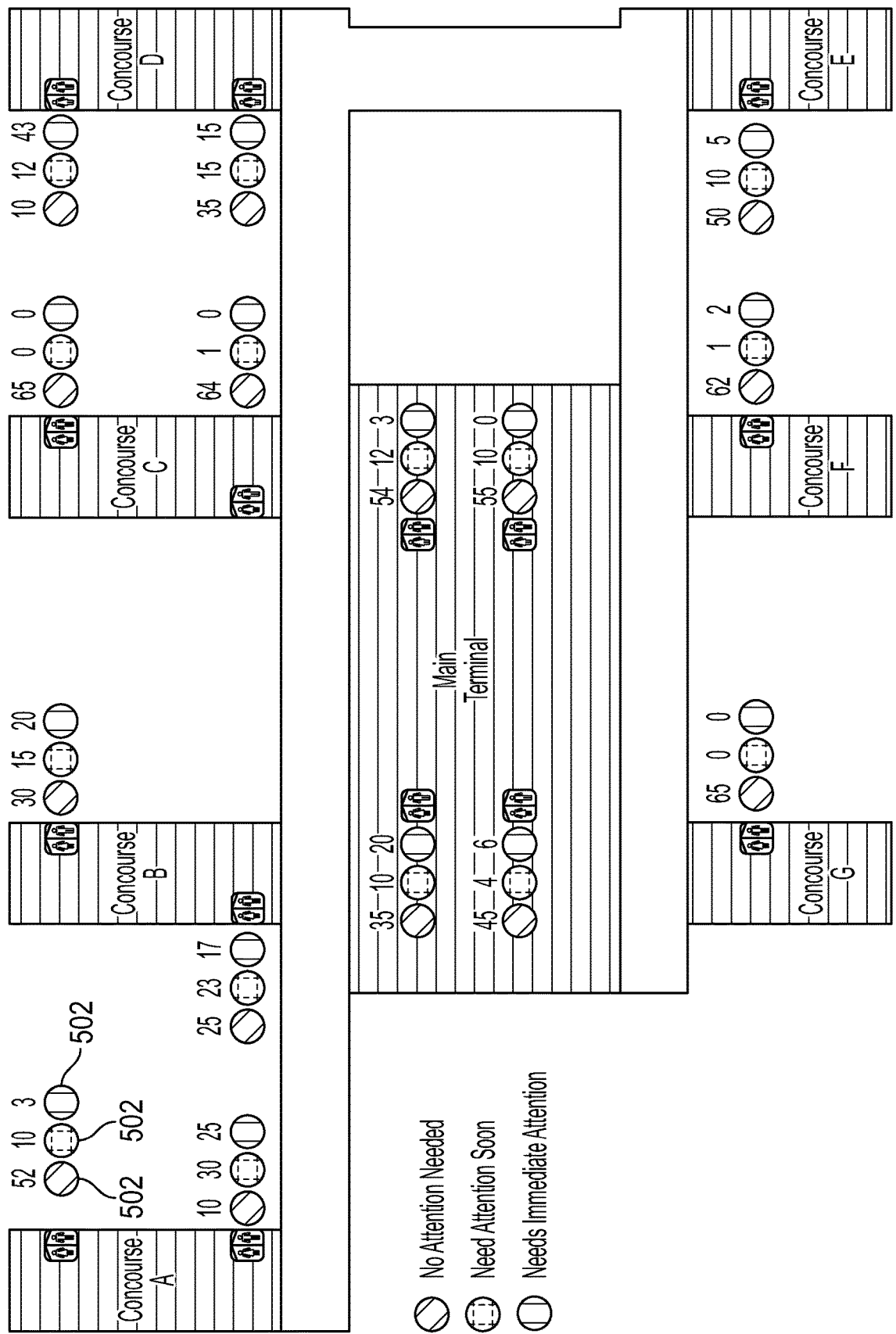
FIG. 7 illustrates a representative embodiment of a graphical user interface of a dashboard view of a building with indicators showing the status of restrooms and their current condition.

By measuring remaining inventory in dispensers (e.g., an amount of paper towels remaining on a roll), data and feedback can be provided to management and/or maintenance personnel of the current condition of a restroom. FIG. 7 shows an exemplary dashboard user interface which can be used as an overview of the condition of multiple restrooms, and/or of individual monitored devices within those restrooms, in a building. The dashboard can show the condition of a selected device or restroom in a color-coded manner using circular indicator icons 502 from among multiple (e.g., three) states in order to identify areas or devices which are in need of maintenance. In one representative example, when no maintenance is required a green indicator can be displayed. When the system determines that service may be needed soon a yellow indicator can be displayed. When a restroom or monitored device needs immediate maintenance, a red indicator can be displayed.

Figure 8:
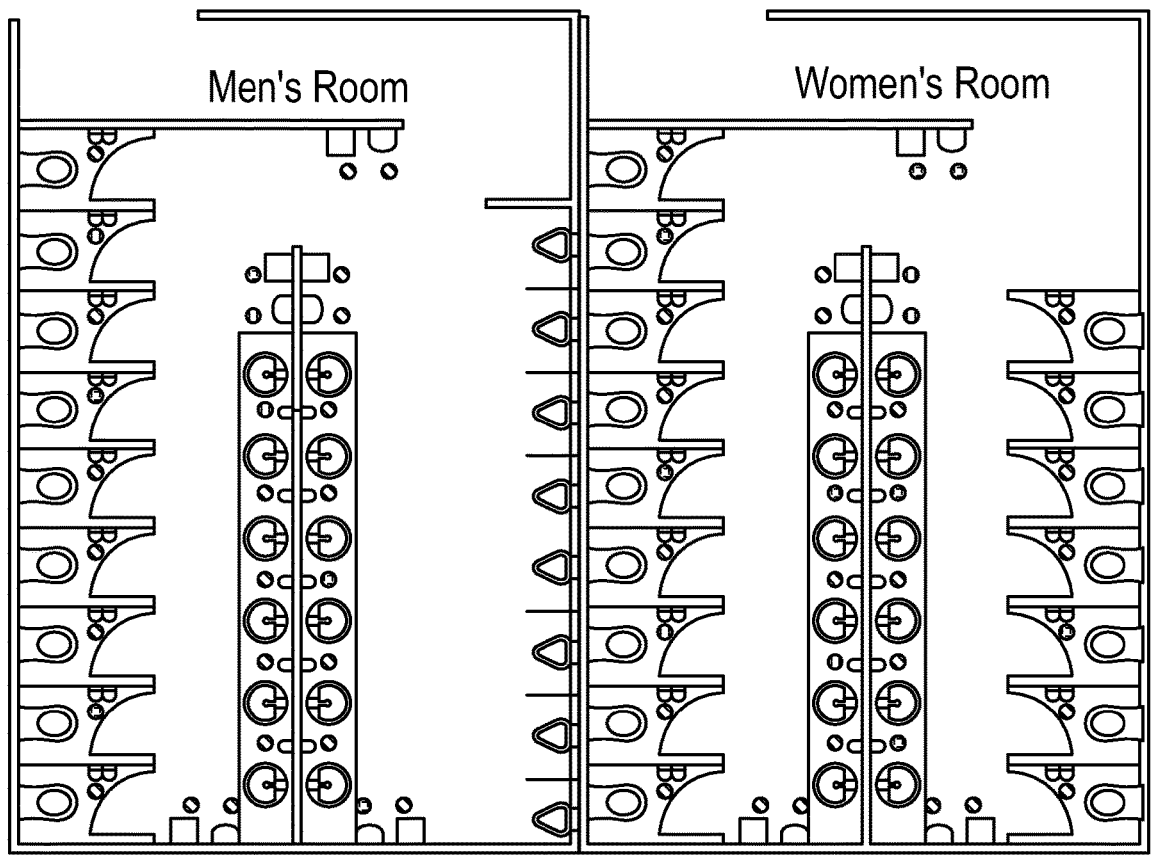
FIG. 8 is a representative embodiment of a graphical user interface of a dashboard view showing a top plan view of a restroom with indicators showing the status of individual sensor nodes.

The sensor and network embodiments described herein can be highly flexible to monitor different parts of a facility, such as one or multiple restrooms. FIG. 8 shows an example of many different fixtures which can be monitored to ensure the condition and quality of service is maintained at a specified level. Examples of these fixtures include monitoring trash cans or waste receptacles 602, paper towel dispensers 604, hand soap dispensers 606, and tissue paper dispensers 608. The dashboard can display sensor information giving a visual representation of the status of supplies currently in use as well as alerting operators about devices or areas that may need service sooner than a scheduled service interval.

Figure 9:
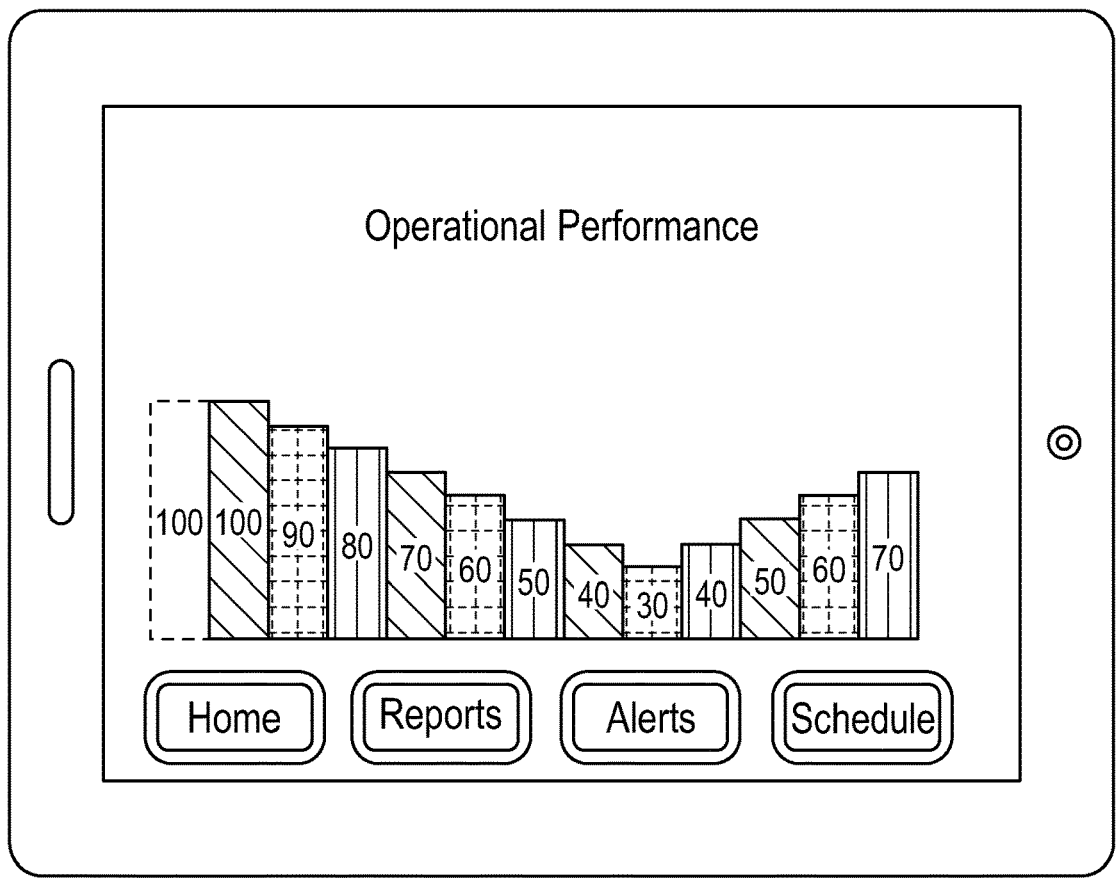
FIG. 9 is a representative embodiment of a graphical user interface for a mobile device or tablet showing operational status and alerts, as well as other tools which pertain to the facility and maintenance personnel performance.

FIG. 9 illustrates a mobile application dashboard or user interface showing the maintenance status (e.g., percentages of remaining consumables in the dispensers) of various monitored devices. System level reports and/or device level reports or statistics can be accessed through the remote computing platform from any device, such as a computer or a mobile device. Alerts can also be generated showing the condition, location, and/or severity of maintenance needs of a monitored device. Alerts can also be generated for detected integrity issues related to the monitored device, such as low battery power of the sensor unit, tampering of the dispenser, need for sensor recalibration, etc. The system can also generate or modify cleaning or maintenance schedules, which can be shown to managers and cleaning/maintenance personnel. For example, based on data received from the sensors the system can determine if a particular monitored device, such as a paper towel dispenser, a soap dispenser, etc., may need refilling or restocking before the device is scheduled to be serviced. The system can then modify the maintenance schedule so that the affected device/restroom is serviced earlier. In other embodiments, the status of the monitored device in the dashboard interface can be updated to indicate that service is required, along with an estimated quantity of consumable product (e.g., number of towels or tissues, volume of soap, etc.) remaining.

Figure 10:
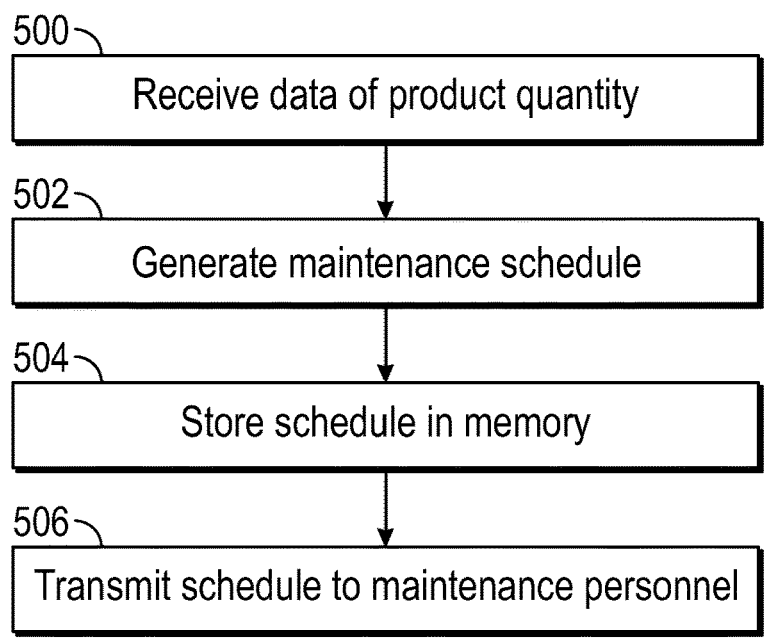
FIG. 10 is a process flow diagram illustrating a method of generating a maintenance schedule and transmitting the schedule to maintenance personnel, according to one embodiment.

Referring to FIG. 10, in one representative example a computer system comprising one or more processors, such as the remote computing platform 12, can receive data of the quantity of consumable products remaining in a plurality of product dispensers in a restroom at process block 500. Based on the data, the platform 12 can generate a schedule for servicing the product dispensers/restroom at process block 502, store the schedule in memory at process block 504, and can transmit or provide the schedule to maintenance personnel over a network at process block 506. In a facility with multiple restrooms, such as an airport, hotel, office building, conference center, stadium, etc., if the platform 12 receives data that a product in a particular dispenser/restroom is running low (e.g., below a predefined threshold) but the dispenser/restroom is not scheduled to be serviced before the product is depleted (also referred to as the detection of an "early depletion" event), the platform 12 can modify or revise the schedule to schedule maintenance of the affected dispenser/restroom before other restrooms on the schedule. The platform can transmit the schedule updates to the maintenance personnel, and/or transmit alerts that particular dispensers/restrooms require maintenance.

More generally, the remote computing platform 12 can be configured to manage the schedules for servicing a plurality of product dispensers (e.g., paper towel dispensers, soap dispensers, etc.) in a plurality of locations (e.g., restrooms, breakrooms, etc.). To that end, the platform 12 can maintain a master schedule containing a plurality of schedules, each schedule corresponding to a respective product dispenser in a specific location. Upon detecting that a product in a specific product dispenser in a specific location has an early depletion event, the platform 12 can update not only a schedule for that product dispenser, but also update schedules for other product dispensers based on one or more factors including the availability of maintenance personnel, the availability of inventory for the product, and/or potential conflicts between the schedules, etc.

In certain embodiments, update of the master schedule can take into account spatial and/or temporal clusters of the product dispensers. For example, if early depletion events have been detected for M product dispensers in a building or within an area with a predefined radius (e.g., 100 feet), then whether the platform 12 updates the master schedule or not can depend on whether M is larger than a predefined threshold, which can be determined based on N—the total number of product dispensers in the building or within the area. For illustration purposes, assume N is 20 and the threshold is 0.1. The platform 12 can determine that the master schedule needs not be updated if M=1 whereas it can update the master schedule if M≥2.

In certain embodiments, the remote computing platform 12 can remotely change, update, or control operational settings of the dispenser units, such as the paper towel dispenser 400. For example, in certain embodiments the sensor unit 100 can interface with or be in communication with a control unit or other electronics of the dispenser unit. Via the sensor unit 100, the remote computing platform 12 can remotely change operational settings of the dispenser unit 400 such as the time delay between dispensing paper towel sheets (the "sheet delay"), and/or the length of paper towel sheets dispensed. The platform 12 can also toggle on or off settings such as whether the dispenser automatically dispenses or exposes a paper towel sheet when in the idle state, or whether a paper towel is dispensed when the dispenser is prompted or activated, such as by detecting a hand-waving motion or by the pressing of a dispenser button. The platform 12 can also remotely turn on or off a paper saving mode in which the length of a second paper towel dispensed within a specified time interval after a first paper towel is shorter than the first paper towel. The platform 12 can also specify the length of the second paper towel (e.g., 50%, 75%, 80%, etc., of the length of the first paper towel). Similar functionality can also be implemented to control operational settings of other types of dispensers, such as soap dispensers (e.g., to specify the quantity of soap dispensed and/or the time interval between dispensing operations).

The systems and methods described herein can provide a number of significant advantages over current methods for scheduling maintenance of dispensers and monitoring consumables in facilities such as restrooms. Collection and display of data from the field, as well as alerts, can improve managers' and cleaning personnel's awareness of inventory levels and current cleaning schedules. The systems described herein can provide building management as well as cleaning service management insights into how clean and well serviced restrooms are. The system can help to ensure that paper towels, soap, and tissue paper are in stock and available with a high degree of reliability, as well as provide metrics and reports to building owners. The systems can also provide building managers and/or service providers the ability to change operational settings of various dispensers in a facility, and to monitor the health of dispensers and associated mechanisms and/or electronics to ensure that they remain in a state of good repair.

Example Integrated Cleaning Service Management

Figure 16:
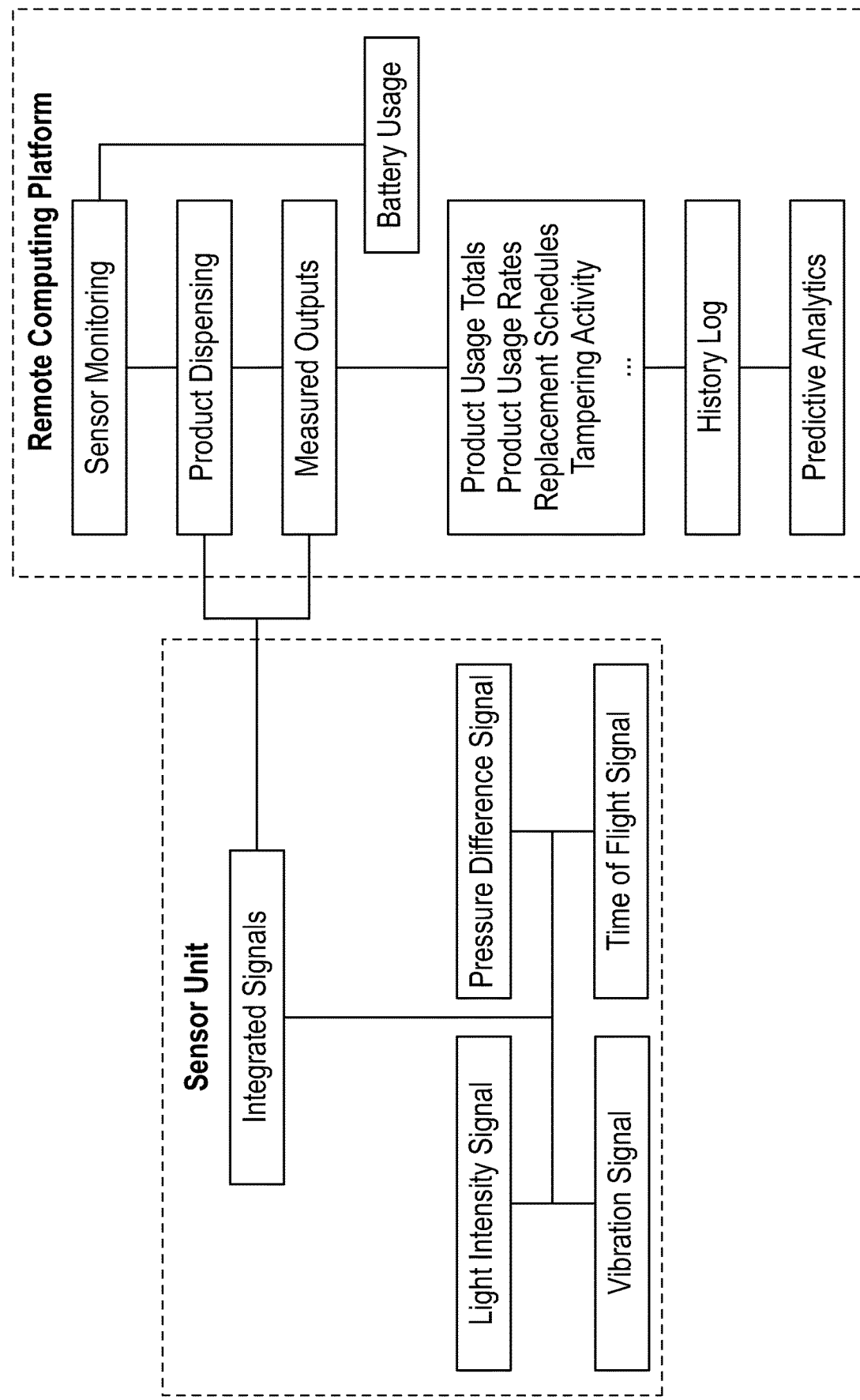
FIG. 16 is a block diagram illustrating a method of integrated cleaning service management, according to one embodiment.

FIG. 16 is a block diagram illustrating an example method of integrated cleaning service management.

As described above, multiple sensors on a sensor unit (e.g., 100 or 150) can generate multiple signals, such as vibration signals (e.g., detected by the accelerometer sensor), time-of-flight signals (e.g., detected by the time-of-flight sensor), light intensity signals (e.g., detected by the light sensor), and pressure difference signals (e.g., detected by the pressure senor), in response to respective triggering events. These signals can be integrated (and pre-processed, if needed), and then transmitted to the remote computing platform (e.g., 12). Based on the received integrated sensor signals, dispensing of consumable product can be detected and a plurality of measures or metrics can be calculated, including the product usage totals (e.g., total dispensed tissue papers/length of tissue), the product usage rate (e.g., dispensed tissue paper per day, hour, etc.), replacement schedule for the consumable product, suspected tampering activities, among others. The remote computing platform can also monitor the integrity of the sensor unit, such as its battery usage and/or status.

In certain embodiments, the calculated metrics and other relevant data can be saved in a history log, which can be maintained and updated in a database. In certain embodiments, the remote computing platform can run a software application which is configured to generate predictive analytics based on the stored history log. For example, based on analysis of the history of usage rate of the consumable product, the software application can predict how much consumable product will be needed in the next day (or week, month, quarter, etc.), and can output suggested product ordering/stocking dates, quantities, etc., (e.g., based in part on data of existing inventory). In another example, the variation in the usage of certain consumable product over different time periods (e.g., morning-afternoon-evening, weekday-weekends, workdays-holidays, etc.) can be detected and serve as an input to inventory management. In yet another example, the analysis of the history log may reveal which dispensers are more frequently used and/or prone to tampering activities. Such information can assist the management team to more strategically allocate, install, and/or service the dispensers. Many other predictive analytics can be similarly obtained to facilitate optimizing the cleaning service management.

Example Computing Environment

Figure 11:
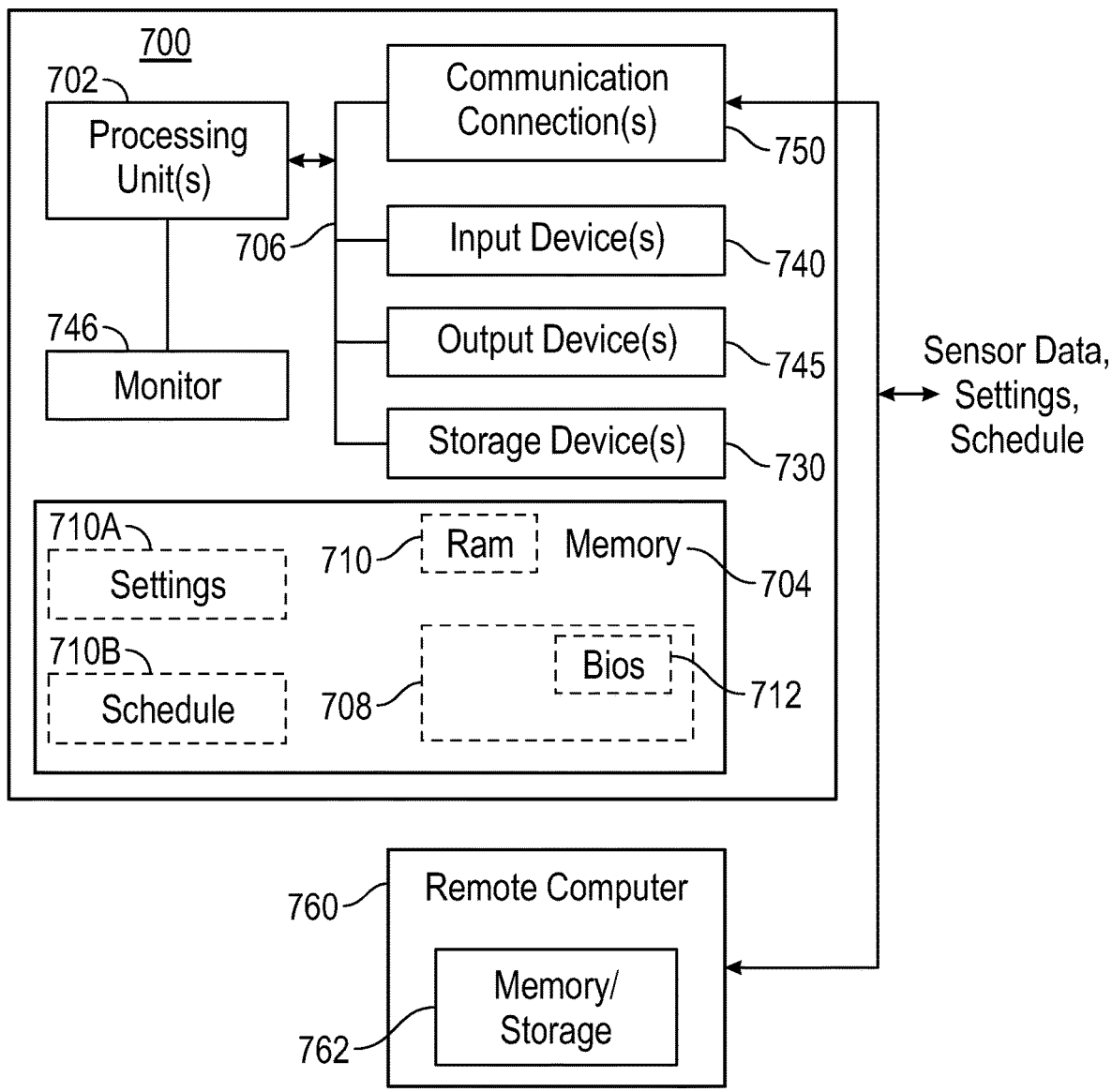
FIG. 11 illustrates a representative computer control system for use in implementing the disclosed systems and methods.

FIG. 11 and the following discussion are intended to provide a brief, general description of an exemplary computing environment in which the disclosed restroom consumables monitoring system technology may be implemented. For example, the methods and processes described herein can be carried out by a processor configured similarly to the computing environment described below. Moreover, the disclosed technology may be implemented with other computer system configurations, including hand held devices, digital signal processors (DSPs), multiprocessor systems, microprocessor-based or programmable consumer electronics, network PCs, minicomputers, mainframe computers, and the like. The disclosed technologies may also be practiced in distributed computing environments, such as remote server or cloud computing environments, where tasks are performed by remote processing devices that are linked through a communications network.

With reference to FIG. 11, an exemplary system for implementing the disclosed technology includes a general-purpose controller in the form of an exemplary conventional personal computer (PC) 700, including one or more processing units 702, a system memory 704, and a system bus 706 that couples various system components including the system memory 704 to the one or more processing units 702. The system bus 706 may be any of several types of bus structures including a memory bus or memory controller, a peripheral bus, and a local bus using any of a variety of bus architectures. The exemplary system memory 704 includes read only memory (ROM) 708 and random-access memory (RAM) 710. A basic input/output system (BIOS) 712, containing the basic routines that help with the transfer of information between elements within the PC 700, is stored in ROM 708. In the example of FIG. 11, data and processor-executable instructions for controlling operation of the sensors, processing, data transmission, etc., are stored in a memory 710A, and data and processor-executable instructions for processing data received from the sensors and generating a dashboard and/or a maintenance schedule are stored in memory 710B. As described herein, in certain embodiments, the PC 700 can also be replaced by a tablet, a smart phone, or other computing devices.

The exemplary PC 700 further includes one or more storage devices 730 such as a hard disk drive for reading from and writing to a hard disk, a magnetic disk drive for reading from or writing to a removable magnetic disk, and an optical disk drive. Such storage devices can be connected to the system bus 706 by a hard disk drive interface, a magnetic disk drive interface, and an optical drive interface, respectively. The drives and their associated computer readable media provide nonvolatile storage of computer-readable instructions, data structures, program modules, and other data for the PC 700. Other types of computer-readable media which can store data that is accessible by a PC, such as magnetic cassettes, flash memory cards, digital video disks.

A number of program modules may be stored in the storage devices 730 including an operating system, one or more application programs, other program modules, and program data. A user may enter commands and information into the PC 700 through one or more input devices 740 such as a keyboard and a pointing device such as a mouse. A monitor 746 or other type of display device is also connected to the system bus 706 via an interface, such as a video adapter. Outputs such as commands, signals, etc., can be transmitted via one or more output devices 745.

The PC 700 may operate in a networked environment using logical connections to one or more remote computers, such as a remote computer 760 including a memory 762. In some examples, one or more network or communication connections 750 are included. The remote computer 760 may be another PC, a server, a router, a network PC, or a peer device or other common network node, and typically includes many or all of the elements described above relative to the PC 700, although only a memory storage device 762 has been illustrated in FIG. 11. The personal computer 700 and/or the remote computer 760 can be connected to a local area network (LAN) and/or a wide area network (WAN). In certain embodiments, the remote computer 760 can comprise a virtual processor implemented in a remote server environment or cloud computing environment.

Explanation of Terms

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

As used in this disclosure and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In some examples, values, procedures, or apparatus may be referred to as "lowest," "best," "minimum," or the like. It will be appreciated that such descriptions are intended to indicate that a selection among many alternatives can be made, and such selections need not be better, smaller, or otherwise preferable to other selections.

In the description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Unless otherwise indicated, all numbers expressing quantities of components, forces, moments, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under test conditions/methods familiar to those of ordinary skill in the art. When directly and explicitly distinguishing embodiments from discussed prior art, the embodiment numbers are not approximates unless the word "about" is recited. Furthermore, not all alternatives recited herein are equivalents.

In view of the many possible embodiments to which the principles of the disclosed technology may be applied, it should be recognized that the illustrated embodiments are only examples and should not be taken as limiting the scope of the disclosure. Rather, the scope of the disclosure is at least as broad as the following claims. We therefore claim all that comes within the scope and spirit of these claims.

The invention claimed is:

1. A method for improved remote management of cleaning services, comprising:
    measuring a quantity of a consumable product remaining in a product dispenser in a restroom using a time-of-flight sensor and an accelerometer sensor concurrently;
    transmitting the quantity of consumable product remaining in the product dispenser to a remote computing platform;
    generating a schedule for servicing the product dispenser based at least in part on the quantity of the consumable product remaining in the product dispenser;
    storing the schedule in a memory; and
    transmitting the schedule to maintenance personnel over a network,
    wherein generating the schedule comprises:
        determining a usage rate of the consumable product based on a history of usage of the consumable product in the product dispenser; and determining an estimated service time for the product dispenser by dividing the quantity of the consumable product remaining in the product dispenser by the usage rate, wherein the time-of-flight sensor is configured to emit a light to the consumable product along a light path, wherein the light path defines an angle between 25 degrees and 30 degrees.

2. The method of claim 1, further comprising:

detecting an early depletion event where a newly measured quantity of consumable product remaining in the product dispenser is below a predefined threshold such that a currently estimated service time for the product dispenser is earlier than the schedule, wherein the currently estimated service time is calculated based at least in part on the newly measured quantity of consumable product remaining in the product dispenser;

updating the schedule based on the currently estimated service time;

storing the updated schedule in the memory; and transmitting the updated schedule to maintenance personnel over the network.

3. The method of claim 2, wherein the product dispenser is a first product dispenser and the schedule is a first schedule contained in a master schedule, wherein the master schedule comprises at least a second schedule for servicing a second product dispenser, and the method further comprises updating the second schedule upon updating the first schedule.

4. The method of claim 1, further comprising detecting a presence of maintenance personnel adjacent the product dispenser based at least in part on scanning for an identifier associated with the maintenance personnel.

5. The method of claim 1, wherein the consumable product is a roll of paper situated in the product dispenser, the method further comprising detecting a change in the quantity of the roll of paper remaining in the product dispenser based on averaging thickness values of the roll of paper that are independently measured by the time-of-flight sensor and the accelerometer sensor.

6. The method of claim 1, wherein:

the consumable product is a roll of paper situated in the product dispenser; and wherein measuring the quantity of consumable product remaining in the product dispenser comprises sensing a thickness of the roll of paper.

7. The method of claim 6, wherein sensing the thickness of the roll of paper comprises measuring a distance between the time-of-flight sensor to an outer surface of the roll of paper.

8. The method of claim 7, wherein sensing the thickness of the roll of paper comprises measuring a vibration signal using the accelerometer sensor, wherein the vibration signal is associated with dispensing of the paper from the product dispenser.

9. The method of claim 1, further comprising detecting opening or closing of the product dispenser using a sensor unit mounted on the product dispenser, wherein the sensor unit comprises the accelerometer sensor configured to detect vibration signals associated with opening or closing of the product dispenser, a light sensor configured to detect light intensity change associated with opening or closing of the product dispenser, and a pressure sensor configured to detect pressure disturbance associated with opening or closing of the product dispenser.

10. The method of claim 1, further comprising transmitting control signals to the product dispenser to turn on an indicator when the quantity of consumable product remaining in the product dispenser falls below a specified threshold.

11. The method of claim 1, wherein determining the usage rate comprises dividing a total amount of the consumable product used in the product dispenser over a period by a duration of the period.

12. The method of claim 1, wherein determining the usage rate comprises performing linear regression analysis based on the history of usage of the consumable product in the product dispenser.

13. The method of claim 1, wherein the time-of-flight sensor has a light path extending from the time-of-flight sensor to the consumable product and is configured to measure a thickness of the consumable product, wherein the accelerometer sensor is configured to detect a vibration associated with dispensing the consumable product from the product dispenser.

14. The method of claim 13, wherein the accelerometer sensor is configured to measure the thickness of the consumable product independently of the time-of-flight sensor, the method further comprising generating an alert when the thickness of the consumable product measured by the time-of-flight sensor deviates from the thickness of the consumable product measured by the accelerometer sensor by more than a predefined threshold.

15. The method of claim 1, further comprising:

detecting opening of the product dispenser using a light sensor inside the product dispenser; and classifying the opening as a maintenance event or a tampering event, wherein the classifying is determined based on (a) whether an identification badge is detected when the product dispenser is opened; and (b) whether the product dispenser is opened within a predefined time window.

16. The method of claim 1, further comprising classifying the quantity of the consumable product remaining in the product dispenser into one of a first class, a second class, and a third class, wherein the first class does not impact the schedule for servicing the product dispenser, the second class generates an alert for servicing the product dispenser, and the third class triggers a change of the schedule for servicing the product dispenser.

17. A system for improved remote cleaning service management, comprising:

a sensor module configured to monitor a quantity of a consumable product remaining in a dispenser; and a remote computing platform in wireless communication with the sensor module, wherein the remote computing platform is configured to determine a schedule for servicing the dispenser based at least in part on the quantity of the consumable product remaining in the dispenser;

wherein the sensor module comprises a time-of-flight sensor having a light path extending from the time-of-flight sensor to the consumable product when the dispenser is in a closed configuration, the time-of-flight sensor being configured to determine a thickness of the consumable product, wherein the light path defines an angle between 25 degrees and 30 degrees;

wherein the sensor module further comprises an accelerometer sensor configured to detect a vibration associated with dispensing the consumable product from the dispenser;

wherein the quantity of consumable product remaining in the dispenser is determined based on concurrent measurement of both the time-of-flight sensor and the accelerometer sensor.

18. The system of claim 17, wherein the time-of-flight sensor is configured to measure the thickness of the consumable product in a first resolution and the accelerometer sensor is configured to measure the thickness of the consumable product in a second resolution that is different from the first resolution,
   wherein the quantity of consumable product remaining in the dispenser is determined by interpolating the thickness of the consumable product measured by the time-of-flight sensor using the thickness of the consumable product measured by the accelerometer sensor.

19. A method for improved remote management of cleaning services, comprising:
   measuring a quantity of a consumable product remaining in a product dispenser in a restroom using a time-of-flight sensor and an accelerometer sensor concurrently;
   transmitting the quantity of consumable product remaining in the product dispenser to a remote computing platform;
   generating a schedule for servicing the product dispenser based at least in part on the quantity of the consumable product remaining in the product dispenser;
   storing the schedule in a memory; and
   transmitting the schedule to maintenance personnel over a network,
   wherein generating the schedule comprises:
      determining a usage rate of the consumable product based on a history of usage of the consumable product in the product dispenser; and
      determining an estimated service time for the product dispenser by dividing the quantity of the consumable product remaining in the product dispenser by the usage rate,
   wherein the time-of-flight sensor has a light path extending from the time-of-flight sensor to the consumable product and is configured to measure a thickness of the consumable product, wherein the accelerometer sensor is configured to detect a vibration associated with dispensing the consumable product from the product dispenser,
   wherein the time-of-flight sensor is configured to measure the thickness of the consumable product in a first resolution and the accelerometer sensor is configured to measure the thickness of the consumable product in a second resolution that is different from the first resolution,
   wherein measuring the quantity of consumable product remaining in the product dispenser comprises interpolating the thickness of the consumable product measured by the time-of-flight sensor using the thickness of the consumable product measured by the accelerometer sensor.

\* \* \* \* \*